(12) United States Patent
Plude et al.

(10) Patent No.: US 11,358,710 B2
(45) Date of Patent: Jun. 14, 2022

(54) METHODS AND APPARATUS FOR CONTROLLING LANDING GEAR RETRACT BRAKING

(71) Applicant: The Boeing Company, Chicago, IL (US)

(72) Inventors: Leo W. Plude, Woodinville, WA (US); Malcolm S. Bryant, Maple Valley, WA (US)

(73) Assignee: THE BOEING COMPANY, Chicago, IL (US)

(*) Notice: Subject to any disclaimer, the term of this patent is extended or adjusted under 35 U.S.C. 154(b) by 746 days.

(21) Appl. No.: 15/904,003

(22) Filed: Feb. 23, 2018

(65) Prior Publication Data
US 2019/0263511 A1 Aug. 29, 2019

(51) Int. Cl.
| | | |
|---|---|---|
| *B64C 25/44* | (2006.01) | |
| *B64C 25/22* | (2006.01) | |
| *B64C 25/28* | (2006.01) | |
| *B64C 25/42* | (2006.01) | |

(52) U.S. Cl.
CPC .............. *B64C 25/44* (2013.01); *B64C 25/22* (2013.01); *B64C 25/28* (2013.01); *B64C 25/42* (2013.01)

(58) Field of Classification Search
CPC ......... B64C 25/44; B64C 25/42; B64C 25/22; B64C 25/28; B64C 25/26
USPC ............................................................ 701/6
See application file for complete search history.

(56) References Cited

U.S. PATENT DOCUMENTS

| | | | |
|---|---|---|---|
| 2,663,521 A | * | 12/1953 | Yarber .................... B64C 25/42 244/111 |
| 2,921,759 A | | 1/1960 | Elkin et al. |
| 2,930,552 A | | 3/1960 | Hartel |
| 2,982,500 A | | 5/1961 | Lucien |
| 3,042,345 A | | 7/1962 | Holland, Jr. |
| 3,485,465 A | * | 12/1969 | Churchill ................ B64C 25/42 244/102 R |
| 3,614,173 A | | 10/1971 | Branson |
| 4,078,845 A | | 3/1978 | Amberg et al. |
| 4,326,755 A | | 4/1982 | Fretz, III |
| 4,576,417 A | | 3/1986 | Dobner |

(Continued)

FOREIGN PATENT DOCUMENTS

| | | |
|---|---|---|
| WO | 0069721 | 11/2000 |
| WO | 2004018274 | 3/2004 |

OTHER PUBLICATIONS

European Patent Office, "Extended European Search Report," issued in connection with European Patent Application No. 18211961.0, dated Jun. 13, 2019, 7 pages.

(Continued)

*Primary Examiner* — Jonathan M Dager
*Assistant Examiner* — Jean W Charleston
(74) *Attorney, Agent, or Firm* — Hanley, Flight & Zimmerman, LLC

(57) ABSTRACT

Methods and apparatus for controlling landing gear retract braking are described. A controller is to determine an on-ground status of a wheel of a landing gear. The controller is to generate a control signal based on the on-ground status of the wheel. The control signal is to initiate a retract braking process for the wheel. The retract braking process is to decelerate the wheel from a first rate of rotation to a second rate of rotation less than the first rate of rotation.

20 Claims, 13 Drawing Sheets

(56) References Cited

U.S. PATENT DOCUMENTS

| | | | |
|---|---|---|---|
| 4,655,312 A | 4/1987 | Frantom et al. | |
| 4,875,391 A | 10/1989 | Leising et al. | |
| 5,040,648 A | 8/1991 | Mitchell et al. | |
| 5,050,940 A | 9/1991 | Bedford et al. | |
| 5,117,934 A | 6/1992 | Tsuyama et al. | |
| 5,201,478 A * | 4/1993 | Wooley | B64C 37/00 244/89 |
| 5,605,387 A | 2/1997 | Cook et al. | |
| 5,623,411 A | 4/1997 | Morvan | |
| 5,700,072 A | 12/1997 | Cook et al. | |
| 5,777,218 A | 7/1998 | Salamat et al. | |
| 5,962,777 A | 10/1999 | Salamat et al. | |
| 6,129,025 A | 10/2000 | Minakami et al. | |
| 6,132,016 A | 10/2000 | Salamat et al. | |
| 6,134,956 A | 10/2000 | Salamat et al. | |
| 6,345,872 B2 | 2/2002 | Salamat et al. | |
| 6,474,598 B2 | 11/2002 | Carter, Jr. | |
| 6,513,885 B1 | 2/2003 | Salamat et al. | |
| 6,527,350 B2 | 3/2003 | Salamat et al. | |
| 6,575,405 B2 | 6/2003 | Bryant et al. | |
| 6,655,755 B2 | 12/2003 | Salamat et al. | |
| 6,704,634 B1 | 3/2004 | Gowan et al. | |
| 6,722,745 B2 | 4/2004 | Salamat et al. | |
| 6,820,946 B2 | 11/2004 | Salamat et al. | |
| 6,824,092 B1 | 11/2004 | Franklin, III et al. | |
| 6,854,689 B1 | 2/2005 | Lindahl et al. | |
| 6,882,920 B2 | 4/2005 | Rudd, III | |
| 6,890,041 B1 | 5/2005 | Ribbens et al. | |
| 6,916,075 B2 | 7/2005 | Salamat et al. | |
| 6,921,045 B2 | 7/2005 | Chang et al. | |
| 6,942,182 B2 | 9/2005 | Quayle | |
| 6,951,372 B2 | 10/2005 | Salamat et al. | |
| 7,039,517 B2 | 5/2006 | Rudd, III | |
| 7,093,795 B2 | 8/2006 | Lindahl et al. | |
| 7,110,873 B2 | 9/2006 | Rudd, III | |
| 7,128,377 B2 | 10/2006 | Salamat et al. | |
| 7,165,820 B2 | 1/2007 | Rudd, III | |
| 7,274,310 B1 | 9/2007 | Nance | |
| 7,387,349 B2 | 6/2008 | Salamat et al. | |
| 7,475,849 B2 | 1/2009 | Lindahl et al. | |
| 7,500,724 B2 | 3/2009 | Salamat et al. | |
| 7,618,100 B2 | 11/2009 | Griffith et al. | |
| 7,744,167 B2 | 6/2010 | Salamat et al. | |
| 7,837,279 B2 | 11/2010 | Salamat et al. | |
| 8,042,765 B1 | 10/2011 | Nance | |
| 8,175,762 B2 | 5/2012 | Trotter et al. | |
| 8,180,548 B2 | 5/2012 | Cahill | |
| 8,335,607 B2 | 12/2012 | Gatten et al. | |
| 8,684,306 B2 | 4/2014 | Martin | |
| 8,695,921 B2 | 4/2014 | Bourret et al. | |
| 8,727,454 B2 | 5/2014 | DeVlieg et al. | |
| 9,266,604 B2 | 2/2016 | Salamat et al. | |
| 9,321,525 B2 | 4/2016 | Luce | |
| 9,327,600 B1 | 5/2016 | Nehmeh | |
| 10,005,566 B2 | 6/2018 | Cahill | |
| 10,933,982 B2 | 3/2021 | Hubbard et al. | |
| 2003/0033927 A1 * | 2/2003 | Bryant | B64C 25/001 91/471 |
| 2003/0111895 A1 * | 6/2003 | Salamat | B60T 8/1703 303/9.61 |
| 2004/0040797 A1 | 3/2004 | Plude et al. | |
| 2004/0189084 A1 | 9/2004 | Salamat et al. | |
| 2005/0225171 A1 | 10/2005 | Salamat et al. | |
| 2006/0181034 A1 | 8/2006 | Wilde et al. | |
| 2006/0293805 A1 | 12/2006 | Garcia | |
| 2007/0132311 A1 | 6/2007 | Giazotto | |
| 2008/0150353 A1 | 6/2008 | Griffith et al. | |
| 2008/0154470 A1 | 6/2008 | Goranson et al. | |
| 2009/0057073 A1 | 3/2009 | Ishii | |
| 2009/0115248 A1 | 5/2009 | Salamat et al. | |
| 2010/0013296 A1 | 1/2010 | Raby et al. | |
| 2010/0274457 A1 | 10/2010 | Cahill | |
| 2013/0015284 A1 | 1/2013 | Tracey et al. | |
| 2014/0021283 A1 | 1/2014 | Tracey et al. | |
| 2014/0100074 A1 | 4/2014 | Glugla | |
| 2014/0100758 A1 | 4/2014 | Glugla et al. | |
| 2014/0131523 A1 | 5/2014 | Garner et al. | |
| 2014/0174066 A1 | 6/2014 | Schulte et al. | |
| 2015/0102163 A1 | 4/2015 | Luce | |
| 2016/0104382 A1 | 4/2016 | Besada Portas et al. | |
| 2016/0104385 A1 | 4/2016 | Alam et al. | |
| 2016/0168822 A1 | 6/2016 | White et al. | |
| 2016/0245190 A1 | 8/2016 | Makled et al. | |
| 2017/0066529 A1 * | 3/2017 | Wilson | B64C 25/405 |
| 2017/0174324 A1 | 6/2017 | Earner et al. | |
| 2017/0183086 A1 * | 6/2017 | Le-Bouedec | G08G 5/0013 |
| 2017/0355473 A1 * | 12/2017 | Cahill | B64F 5/60 |
| 2018/0362151 A1 * | 12/2018 | Marles | G05D 3/10 |
| 2019/0168884 A1 * | 6/2019 | Stafford | B64D 29/08 |
| 2019/0263506 A1 | 8/2019 | Hubbard et al. | |

OTHER PUBLICATIONS

European Patent Office, "Supplementary European Search Report," issued in connection with European Patent Application No. 18212931.2, dated Jul. 22, 2019, 3 pages.

European Patent Office, "Communication pursuant to Article 94(3) EPC," issued in connection with European Patent Application No. 18212931.2, dated Feb. 27, 2020, 5 pages.

European Patent Office, "Communication pursuant to Article 94(3) EPC," issued in connection with European Patent Application No. 18212931.2, dated Aug. 6, 2019, 6 pages.

United States Patent and Trademark Office, "Non-Final Office Action," issued in connection with U.S. Appl. No. 15/905,392, dated Dec. 19, 2019, 20 pages.

United States Patent and Trademark Office, "Final Office Action," issued in connection with U.S. Appl. No. 15/905,392, dated Feb. 12, 2020, 30 pages.

United States Patent and Trademark Office, "Advisory Action," issued in connection with U.S. Appl. No. 15/905,392, dated Apr. 13, 2020, 6 pages.

United States Patent and Trademark Office, "Non-Final Office Action," issued in connection with U.S. Appl. No. 15/905,392, dated May 27, 2020, 30 pages.

United States Patent and Trademark Office, "Non-Final Office Action," issued in connection with U.S. Appl. No. 15/905,392, dated Jul. 8, 2020, 37 pages.

United States Patent and Trademark Office, "Notice of Allowance and Fee(s) Due," issued in connection with U.S. Appl. No. 15/905,392, dated Dec. 30, 2020, 10 pages.

* cited by examiner

METHODS AND APPARATUS FOR CONTROLLING LANDING GEAR RETRACT BRAKING

FIELD OF THE DISCLOSURE

This disclosure relates generally to landing gear for aircraft and, more particularly, to methods and apparatus for controlling landing gear retract braking.

BACKGROUND

Aircraft (e.g., commercial aircraft) commonly include landing gear (e.g., left main landing gear, right main landing gear, etc.) that may be hydraulically actuated to move between a deployed position and a retracted position. For example, the landing gear of an aircraft may by hydraulically actuated to move from the deployed position to the retracted position subsequent to and/or in connection with a takeoff procedure of the aircraft, and from the retracted position back to the deployed position prior to and/or in connection with a landing procedure of the aircraft.

One or more wheel(s) of the landing gear may be stored and/or housed within a well of the aircraft when the landing gear is in the retracted position. The wheels of the landing gear spin during and subsequent to takeoff, and typically remain spinning at the time the landing gear begins to move from the deployed position to the retracted position. A collision between the wheels of the landing gear and the well of the aircraft may occur if the wheels remain spinning at the time the wheels begin to enter the well. Undesirable noise and/or vibration may occur within the cabin of the aircraft if the wheels remain spinning once inside the well.

Hydraulic or electric retract braking systems may be implemented to decelerate and/or despin the wheels of the landing gear prior to and/or while the landing gear moves from the deployed position to the retracted position. Actuation of such hydraulic or electric retract braking systems typically occurs in response to a manual actuation (e.g., via a pilot of the aircraft) of a landing gear lever located in a cockpit of the aircraft. During takeoff, the manual actuation of the landing gear lever by the pilot of the aircraft occurs only after the pilot has first ascertained (e.g., physically determined) that the aircraft is airborne (e.g., that no landing gear of the aircraft is in contact with a ground surface and a positive rate of climb has been established). As a result of typical human and/or pilot response times, the time at which the manual actuation of the landing gear lever occurs may be delayed relative to the time at which the aircraft first becomes airborne. Such delays limit the amount of time available to decelerate and/or despin the wheels of the landing gear before the wheels enter the well of the aircraft.

Some aircraft implement landing gear that must be shrunk (e.g., reduced in length) prior to being moved from the deployed position to the retracted position. For example, the length of the landing gear may need to be reduced (e.g., shrunk) such that the landing gear is able to fit within the spatial confines of a well of the aircraft that stows the landing gear in the retracted position. In some such aircraft, rapid deceleration and/or despin of the wheels may result in an applied moment that decreases the length of the landing gear, followed by a rebound that increases the length of the landing gear. The applied moment and rebound may fatigue certain structural components of the landing gear, and may also cause such structural components and/or the wheels of the landing gear to be out of place when entering the well of the aircraft, thereby resulting in a collision.

SUMMARY

Methods and apparatus for controlling landing gear retract braking are disclosed. In some examples, an apparatus is disclosed. In some disclosed examples, the apparatus comprises a controller. In some disclosed examples, the controller is to determine an on-ground status of a wheel of a landing gear. In some disclosed examples, the controller is to generate a control signal based on the on-ground status of the wheel. In some disclosed examples, the control signal is to initiate a retract braking process for the wheel. In some disclosed examples, the retract braking process is to decelerate the wheel from a first rate of rotation to a second rate of rotation less than the first rate of rotation.

In some examples, a method is disclosed. In some disclosed examples, the method comprises determining, by executing one or more instructions via a controller, an on-ground status of a wheel of a landing gear. In some disclosed examples, the method further comprises generating, by executing one or more instructions via the controller, a control signal based on the on-ground status of the wheel. In some disclosed examples, the control signal is to initiate a retract braking process for the wheel. In some disclosed examples, the retract braking process is to decelerate the wheel from a first rate of rotation to a second rate of rotation less than the first rate of rotation.

In some examples, a non-transitory machine-readable storage medium comprising instructions is disclosed. In some disclosed examples, the instructions, when executed, cause a controller to determine an on-ground status of a wheel of a landing gear. In some disclosed examples, the instructions, when executed, cause the controller to generate a control signal based on the on-ground status of the wheel. In some disclosed examples, the control signal is to initiate a retract braking process for the wheel. In some disclosed examples, the retract braking process is to decelerate the wheel from a first rate of rotation to a second rate of rotation less than the first rate of rotation.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Figure 1:
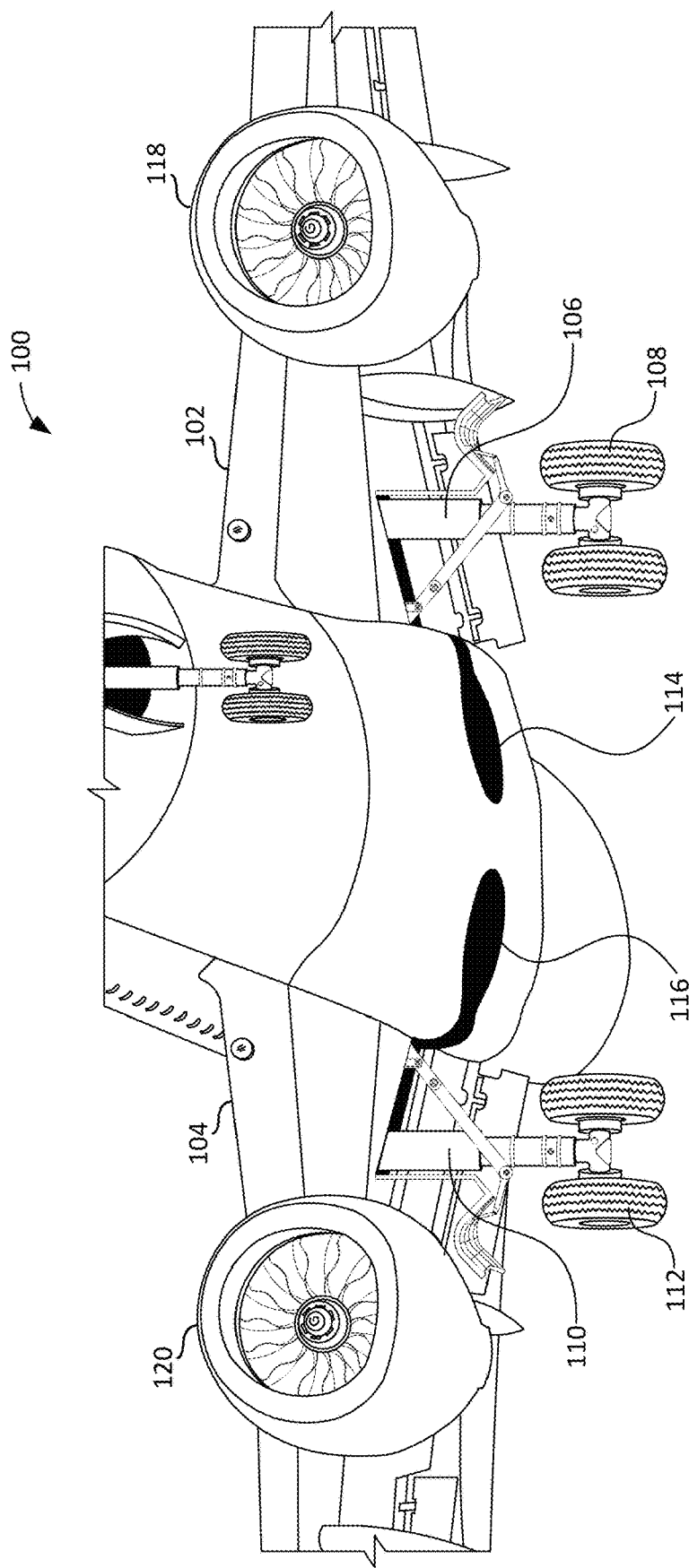
FIG. 1 illustrates an example aircraft in which an example retract braking control system may be implemented in accordance with the teachings of this disclosure.

FIG. 1 illustrates an example aircraft 100 in which an example retract braking system may be implemented in accordance with the teachings of this disclosure. The aircraft 100 includes an example left wing 102 and an example right wing 104. The aircraft 100 also includes an example left main landing gear (LMLG) 106 coupled to the left wing 102 and having a first example set of wheels 108, and an example right main landing gear (RMLG) 110 coupled to the right wing 104 and having a second example set of wheels 112. In the illustrated example of FIG. 1, the first set of wheels 108 and the second set of wheels 112 respectively include two wheels. In other examples, the first set of wheels 108 and the second set of wheels 112 may respectively include a number of wheels other than two (e.g., one wheel, four wheels, etc.).

In the illustrated example of FIG. 1, the LMLG 106 and the RMLG 110 are in a deployed (e.g., downlocked) position. The LMLG 106 is movable from the deployed position shown in FIG. 1 to a retracted position in which the LMLG 106 and/or the first set of wheels 108 is/are positioned in a first example well 114 of the aircraft 100 of FIG. 1. The RMLG 110 is also movable from the deployed position shown in FIG. 1 to a retracted position in which the RMLG 110 and/or the second set of wheels 112 is/are positioned in a second example well 116 of the aircraft 100 of FIG. 1. Downlock members (e.g., downlock struts, rods, shafts, and/or links) that are respectively coupled to corresponding ones of the LMLG 106 and the RMLG 110 of FIG. 1 may be positioned and/or engaged to secure and/or lock the LMLG 106 and the RMLG 110 in the deployed position, and may be repositioned and/or disengaged to enable the LMLG 106 and the RMLG 110 to be moved from the deployed position to the retracted position. Movement of the LMLG 106 and the RMLG 110 between the deployed and retracted positions occurs via a landing gear hydraulic actuation system located within the aircraft 100 of FIG. 1. The landing gear hydraulic actuation system is operatively coupled to a controller located within the aircraft 100 of FIG. 1. The controller manages and/or controls the operation of the landing gear hydraulic actuation system.

The first set of wheels 108 of the LMLG 106 and the second set of wheels 112 of the RMLG 110 spin and/or rotate following takeoff of the aircraft 100. In some examples, the rate of spin and/or rotation of the first and second sets of wheels 108, 112 may exceed eighteen hundred revolutions per minute (1800 rpm). A braking process may be implemented during a landing gear retraction process to reduce the rate of rotation and/or spin of the first and second sets of wheels 108, 112 to a value of zero revolutions per minute (0 rpm). In some examples, it is desirable that the braking process be completed prior to the LMLG 106 and the RMLG 110 reaching the retracted position, and/or prior to the first and second sets of wheels 108, 112 entering respective ones of the first and second wells 114, 116. Braking (e.g., deceleration and/or despin) of the first set of wheels 108 and the second set of wheels 112 during the landing gear retraction process occurs via a hydraulic retract braking system and/or an electric retract braking system located within the aircraft 100 of FIG. 1. The hydraulic retract braking system and/or the electric retract braking system is/are operatively coupled to a controller located within the aircraft 100 of FIG. 1. The controller manages and/or controls the operation of the hydraulic retract braking system and/or the electric retract braking system.

In some examples, a landing gear lever located within the aircraft 100 of FIG. 1 (e.g., in a cockpit of the aircraft 100) is operatively coupled to the controller. Movement of the landing gear lever (e.g., via a pilot) between a down position and an up position generates corresponding positional inputs to be received by the controller to facilitate movement of the LMLG 106 and the RMLG 110 between the deployed and retracted positions described above. The landing gear lever may be moved from the down position to the up position subsequent to and/or in connection with a takeoff procedure of the aircraft 100 of FIG. 1. The landing gear lever may be moved from the up position to the down position prior to and/or in connection with a landing procedure of the aircraft 100 of FIG. 1. In some examples, operation of the retract braking control systems disclosed herein may be based in part on the position of the landing gear lever.

In other examples (e.g., in examples where the aircraft 100 of FIG. 1 is an unmanned and/or autonomous aircraft), a landing gear position manager (e.g., a programmable processor) located within the aircraft 100 of FIG. 1 is operatively coupled to the controller. The landing gear position manager may be remotely programmed, commanded, set, and/or controlled to obtain, take on, and/or achieve a first state corresponding to a down position or a second state corresponding to an up position to generate corresponding positional inputs to be received by the controller to facilitate movement of the LMLG 106 and the RMLG 110 between the deployed and retracted positions described above. The landing gear position manager may be remotely programmed, commanded, and/or set to the first state corresponding to the up position subsequent to and/or in connection with a takeoff procedure of the aircraft 100 of FIG. 1. The landing gear position manager may be remotely programmed, commanded, and/or set to the second state corresponding to the down position prior to and/or in connection with a landing procedure of the aircraft 100 of FIG. 1. In some examples, operation of the retract braking control systems disclosed herein may be based in part on the state and/or the corresponding position of the landing gear position manager.

Respective ones of the LMLG 106 and the RMLG 110 have a first length (e.g., an unshrunk length) when positioned in the deployed (e.g., downlocked) position shown in FIG. 1. For example, the first length of the LMLG 106 may be measured from the underside of the left wing 102 of the aircraft 100 to the bottom of the first set of wheels 108 when the LMLG 106 is positioned in the deployed position shown in FIG. 1, and the first length of the RMLG 110 may be measured from the underside of the right wing 104 of the aircraft 100 to the bottom of the second set of wheels 112 when the RMLG 110 is positioned in the deployed position shown in FIG. 1. In some examples, the first length (e.g., the unshrunk length) of the LMLG 106 and/or the RMLG 110 may exceed spatial limitations defined by the shape and/or volume of corresponding ones of the first well 114 and/or the second well 116 of the aircraft 100 of FIG. 1. In such examples, it becomes necessary to shrink (e.g., to reduce the length of) the LMLG 106 and/or the RMLG 110 from the first length to a second length (e.g., a shrunk length) that is less than the first length, and which enables the LMLG 106 and/or the RMLG 110 to fit within the spatial limitations defined by the shape and/or volume of the corresponding ones of the first well 114 and/or the second well 116 of the aircraft 100 of FIG. 1.

Shrinking and/or unshrinking of the LMLG 106 and/or the RMLG 110 of FIG. 1 may occur via the above-described landing gear hydraulic actuation system of the aircraft 100 of FIG. 1. The LMLG 106 and/or the RMLG 110 of FIG. 1 may be shrunk (e.g. reduced in length) from the first length to the second length prior to and/or in connection with moving the LMLG 106 and/or the RMLG 110 from the deployed position to the retracted position, and may be unshrunk (e.g., increased in length) from the second length to the first length subsequent to and/or in connection with moving the LMLG 106 and/or the RMLG 110 from the retracted position to the deployed position. In some examples, the difference between the first length (e.g., the unshrunk length) and the second length (e.g., the shrunk length) of respective ones of the LMLG 106 and the RMLG 110 of FIG. 1 may be approximately nine inches. In other examples, the difference between the first length and the second length may be greater than or less than nine inches (e.g., six inches, twelve inches, etc.).

Figure 2:
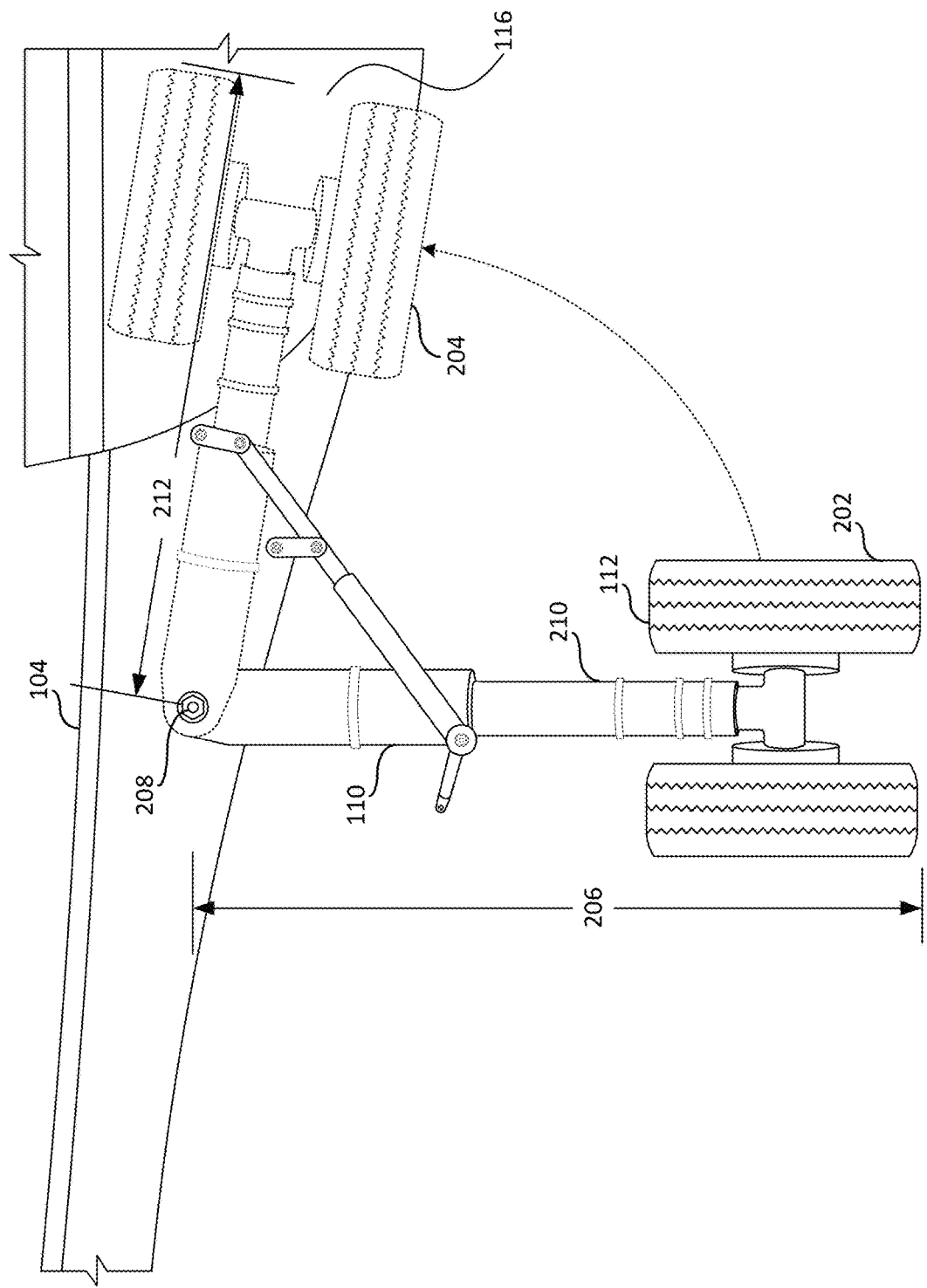
FIG. 2 illustrates the example RMLG of FIG. 1 positioned in an example deployed position and alternatively positioned in an example retracted position.

FIG. 2 illustrates the example RMLG 110 of FIG. 1 positioned in an example deployed position 202 and alternatively positioned in an example retracted position 204. The RMLG 110 of FIGS. 1 and 2 may be positioned in the deployed position 202 of FIG. 2 when the second set of wheels 112 of the RMLG 110 of FIGS. 1 and 2 is not in contact with a ground surface (e.g., when the aircraft 100 of FIG. 1 is airborne). The RMLG 110 of FIGS. 1 and 2 has an example first length 206 measured from an example axis of rotation 208 of the RMLG 110 to the bottom of the second set of wheels 112 of FIGS. 1 and 2 when the RMLG 110 is in the deployed position 202 shown in FIG. 2. In examples where the RMLG 110 is a shrinkable landing gear, the first length 206 of FIG. 2 may be associated with an example landing gear oleo strut 210 of the RMLG 110 of FIGS. 1 and 2 being uncompressed and/or extended in response to the weight of the aircraft 100 being removed from the RMLG 110 subsequent to and/or in connection with takeoff of the aircraft 100. In examples where the RMLG 110 is not a shrinkable landing gear, the first length 206 is a static and/or fixed length.

The RMLG 110 of FIGS. 1 and 2 may be positioned in the retracted position 204 of FIG. 2 (shown in phantom) when the RMLG 110 of FIGS. 1 and 2 is retracted into the second well 116 of FIGS. 1 and 2. The RMLG 110 of FIGS. 1 and 2 has an example second length 212 measured from the axis of rotation 208 of the RMLG 110 to the bottom of the second set of wheels 112 of FIGS. 1 and 2 when the RMLG 110 is in the retracted position 204 shown in FIG. 2. In examples where the RMLG 110 is a shrinkable landing gear, the second length 212 of FIG. 2 is less than the first length 206 of FIG. 2. In some such examples, the second length 212 of FIG. 2 may be approximately nine inches less than the first length 206 of FIG. 2. In other such examples, the difference between the first length 206 and the second length 212 of FIG. 2 may be greater than or less than nine inches (e.g., six inches, twelve inches, etc.). The second length 212 of FIG. 2 may be associated with the landing gear oleo strut 210 of the RMLG 110 of FIGS. 1 and 2 being shrunk and retracted (e.g., from the unshrunk deployed position 202 of FIG. 2). In examples where the RMLG 110 is not a shrinkable landing gear, the second length 212 is equal to the first length 206. The RMLG 110 fits within the spatial limitations defined by the shape and/or volume of the second well 116 of FIGS. 1 and 2 when the RMLG 110 is in the retracted position 204 of FIG. 2.

Returning to the illustrated example of FIG. 1, the aircraft 100 also includes an example left engine 118 and an example right engine 120. The speed at which the left engine 118 runs and/or operates is controlled based on inputs received from and/or provided by a left throttle (e.g., a left throttle lever) located within the aircraft 100 of FIG. 1 (e.g., in a cockpit of the aircraft 100). The speed at which the right engine 120 runs and/or operates is controlled based on positional inputs received from and/or provided by a right throttle (e.g., a right throttle lever) located within the aircraft 100 of FIG. 1 (e.g., in a cockpit of the aircraft 100). Movement of the left throttle and the right throttle (e.g., via a pilot) beyond a throttle position threshold (e.g., beyond fifty degrees) may occur prior to and/or in connection with a takeoff procedure of the aircraft 100 of FIG. 1. Respective ones of the left engine 118 and the right engine 120 may exceed an engine speed threshold speed prior to and/or in connection with the takeoff procedure. In some examples, operation of the retract braking control systems disclosed herein may be based in part on the respective positions of the left throttle and the right throttle, and/or the respective speeds of the left engine 118 and the right engine 120.

In other examples (e.g., in examples where the aircraft 100 of FIG. 1 is an unmanned and/or autonomous aircraft), a left throttle position manager and a right throttle position manager (e.g., one or more programmable processor(s)) located within the aircraft 100 of FIG. 1 are operatively coupled to the controller. The left throttle position manager and the right throttle position manager may be remotely programmed, commanded, set, and/or controlled to obtain, take on, and/or achieve various states corresponding to various throttle positions to generate corresponding throttle positional inputs to be received by the controller. The left throttle position manager and the right throttle position manager may respectively be remotely programmed, commanded, and/or set to a state corresponding to a position beyond a throttle position threshold subsequent to and/or in connection with a takeoff procedure of the aircraft 100 of FIG. 1. In some examples, operation of the retract braking control systems disclosed herein may be based in part on the respective states and/or the corresponding respective positions of the left throttle position manager and the right throttle position manager.

The aircraft 100 also includes one or more wing flap(s) located on respective ones of the left and right wings 102, 104. The wing flaps may be moved between an example stowed position and an example deployed position relative to the left and right wings 102, 104. The position of the wing flaps may be based on inputs received from and/or provided by a flap lever located within the aircraft 100 of FIG. 1 (e.g., in a cockpit of the aircraft 100) and operatively coupled to the controller. The position of the wing flaps may alternatively be based on inputs received from and/or provided by one or more flap position feedback sensor(s) located at and/or on respective ones of the wing flaps and operatively coupled to the controller. In some examples, operation of the retract braking control systems disclosed herein may be based in part on the flap position(s) of the wing flap(s).

In other examples (e.g., in examples where the aircraft 100 of FIG. 1 is an unmanned and/or autonomous aircraft), a flap position manager (e.g., one or more programmable processor(s)) located within the aircraft 100 of FIG. 1 is operatively coupled to the controller. The flap position manager may be remotely programmed, commanded, set, and/or controlled to obtain, take on, and/or achieve various states corresponding to various flap positions to generate corresponding flap positional inputs to be received by the controller. The flap position manager may be remotely programmed, commanded, and/or set to a state corresponding to a position of the wing flaps of the left and right wings 102, 104. In some examples, operation of the retract braking control systems disclosed herein may be based in part on the state and/or the corresponding position of the flap position manager.

Figure 3:
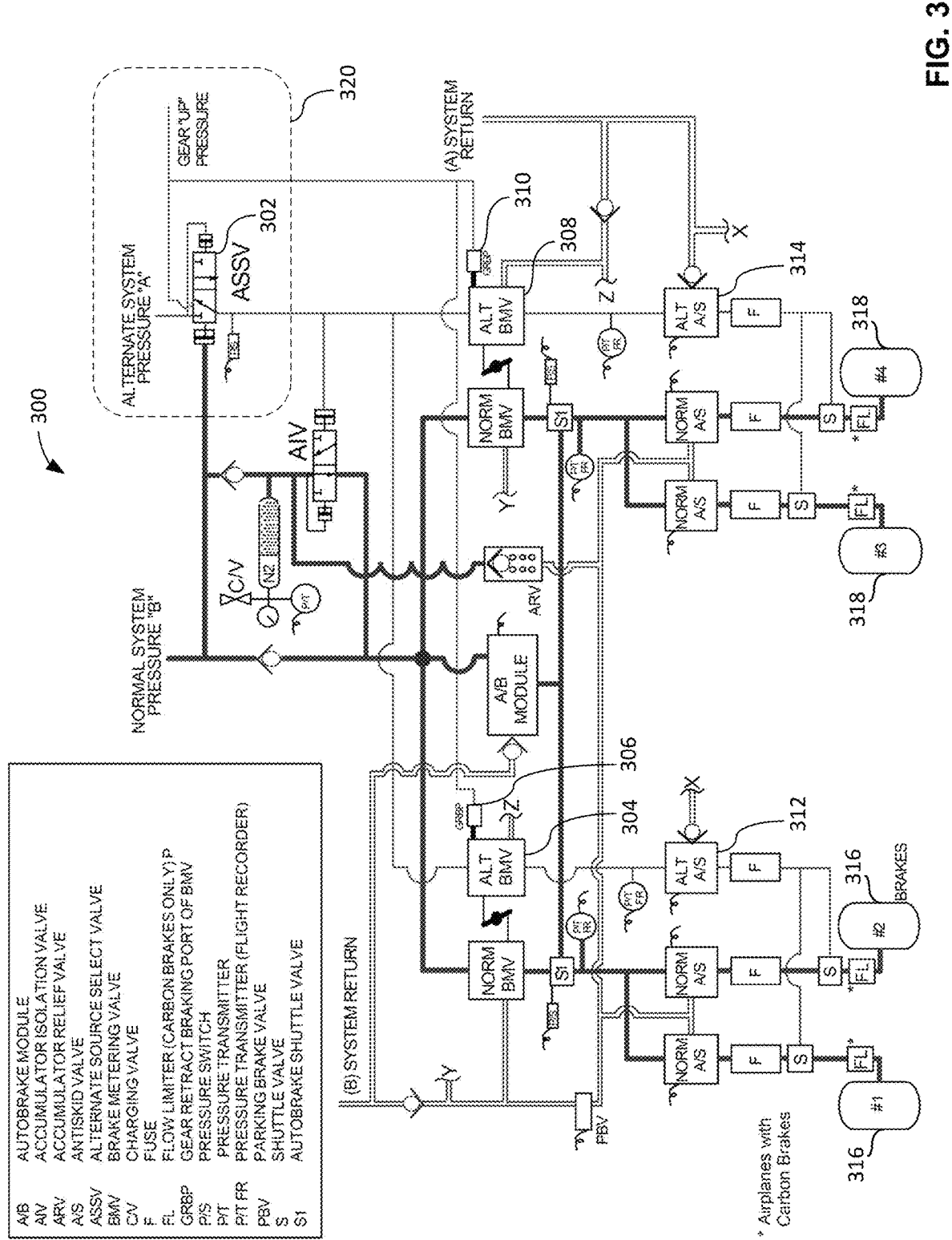
FIG. 3 is a schematic of a known hydraulic retract braking system.

FIG. 3 is a schematic of a known hydraulic retract braking system 300. The hydraulic retract braking system 300 of FIG. 3 may be implemented to provide retract braking to the first set of wheels 108 of the LMLG 106 and the second set of wheels 112 of the RMLG 110 of the aircraft 100 of FIG. 1 in connection with a landing gear retraction process. The hydraulic retract braking system 300 of FIG. 3 includes an alternate source select valve (ASSV) 302, a left alternate brake metering valve (left ALT BMV) 304 having a left gear retract braking port (left GRBP) 306, a right alternate brake metering valve (right ALT BMV) 308 having a right gear retract braking port (right GRBP) 310, a left alternate antiskid valve (left ALT A/S valve) 312, a right alternate antiskid valve (right ALT A/S valve) 314, left brakes 316, and right brakes 318. The left ALT A/S valve 312 is operatively positioned between the left ALT BMV 304 and the left brakes 316. The right ALT A/S valve 314 is operatively positioned between the right ALT BMV 308 and the right brakes 318. The left brakes 316 may be operatively coupled to the first set of wheels 108 of the LMLG 106 of FIG. 1, and the right brakes 318 may be operatively coupled to the second set of wheels 112 of the RMLG 110 of FIG. 1. In such an example, application of the left brakes 316 decelerates and/or despins the first set of wheels 108 of the LMLG 106 of FIG. 1, and application of the right brakes 318 decelerates and/or despins the second set of wheels 112 of the RMLG 110 of FIG. 1.

A flow control member of the ASSV 302 of FIG. 3 is movable and/or actuatable between the first ASSV control position shown in FIG. 3 and a second ASSV control position. The flow control member of the ASSV 302 of FIG. 3 is hydraulically biased via the normal "B" system pressure into the first control position shown in FIG. 3, and remains in the first control position absent a loss of pressure and/or a hydraulic failure of the normal "B" system. When the flow control member of the ASSV 302 of FIG. 3 is in the first control position shown in FIG. 3, a gear "UP" pressure conduit is in fluid communication with and/or is ported to an alternate "A" system supply conduit. The gear "UP" pressure conduit may be pressurized in response to the landing gear lever of the aircraft being moved from a gear "DOWN" position into a gear "UP" position.

The alternate "A" system pressure shown in FIG. 3 passes through the ASSV 302 and is routed to the left ALT BMV 304 and the right ALT BMV 308. The alternate "A" system pressure is prevented from flowing past the left ALT BMV 304 and the right ALT BMV 308 until the gear "UP" pressure (which is at the alternate "A" system pressure) pressurizes the alternate (e.g., retract) brake system and hydraulically actuates the left GRBP 306 and the right GRBP 310. The pressurized left GRBP 306 and right GRBP 310, in turn, cause the left ALT BMV 304 and the right ALT BMV 308 to meter sufficient alternate "A" system pressure to the left ALT A/S valve 312 and the right ALT A/S valve 314 to decelerate and/or despin, via the left brakes 316 and the right brakes 318, the wheels of the landing gear (e.g., the first set of wheels 108 of the LMLG 106 and/or the second set of wheels 112 of the RMLG 110 of FIG. 1) that are operatively coupled to the hydraulic retract braking system 300 of FIG. 3. Therefore, in the hydraulic retract braking system 300 of FIG. 3, the deceleration and/or despin of the wheels of the landing gear is entirely dependent upon the landing gear lever of the aircraft being moved from the gear "DOWN" position into the gear "UP" position. As further described below in connection with FIGS. 9A and 9B, an example portion 320 of the hydraulic retract braking system 300 of FIG. 3 may be modified in accordance with the teachings of this disclosure to provide an improved hydraulic retract braking control system.

Figure 4:
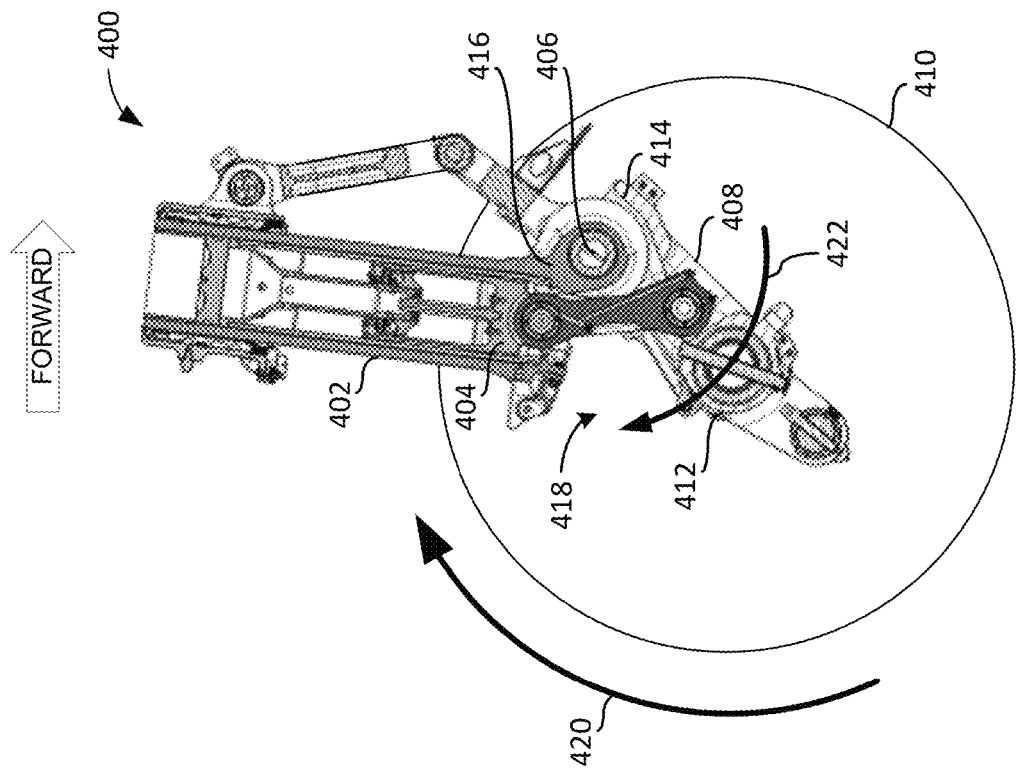
FIG. 4 is a cross-sectional view of an example landing gear constructed in accordance with the teachings of this disclosure.

FIG. 4 is a cross-sectional view of an example landing gear 400 constructed in accordance with the teachings of this disclosure. In some examples, the LMLG 106 and/or the RMLG 110 of FIGS. 1 and 2 may be implemented via the landing gear 400 of FIG. 4. The landing gear 400 of FIG. 4 includes an example upper strut inner cylinder 402, an example lower strut 404, an example pivot pin 406, an example lower link 408, and an example wheel 410. While a single wheel 410 is shown in FIG. 4, the landing gear 400 may include additional wheels (e.g., a second wheel, etc.) forming a set of wheels (e.g., similar to the first set off wheels 108 and/or the second set of wheels 112 shown in FIGS. 1 and 2). In the illustrated example of FIG. 4, the lower strut 404 is slidable within the upper strut inner cylinder 402. The lower link 408 includes a first example end 412 and a second example end 414 located opposite the first end 412. The wheel 410 is rotatably coupled to the first end 412 of the lower link 408. The second end 414 of the lower link 408 is pivotably coupled to a first example end 416 of the upper strut inner cylinder 402 via the pivot pin 406. The lower link 408 is accordingly movable and/or pivotable relative to the upper strut inner cylinder 402 about the pivot pin 406.

Figure 5:
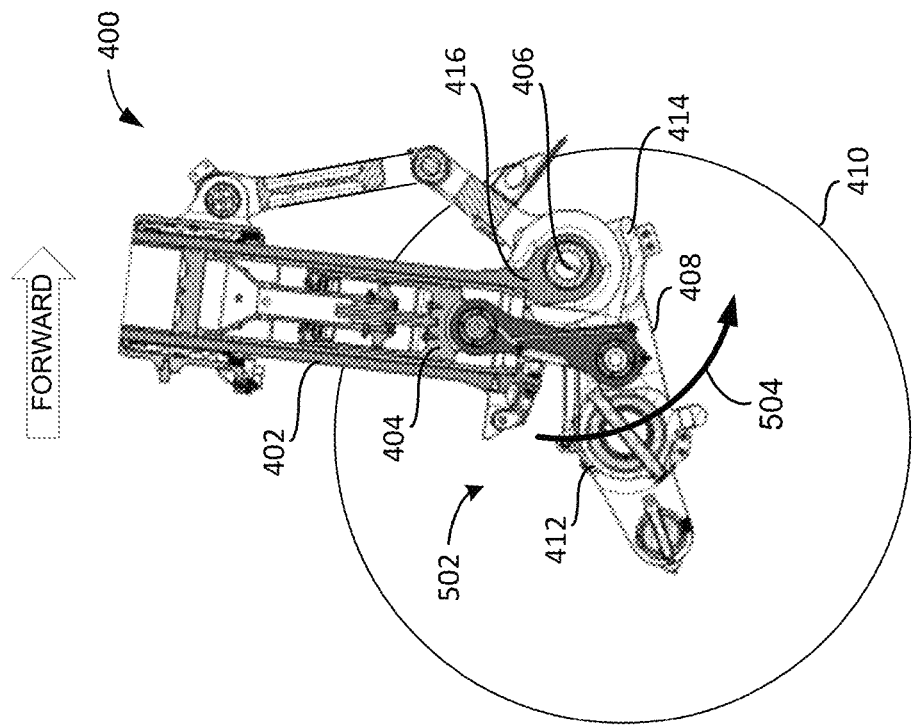
FIG. 5 is a cross-sectional view of the example lower link of the example landing gear of FIG. 4 in a second example position relative to the example upper strut inner cylinder of the example landing gear of FIG. 4.

In the illustrated example of FIG. 4, the lower link 408 of the landing gear 400 is in a first example position 418 relative to the upper strut inner cylinder 402 of the landing gear 400. FIG. 5 is a cross-sectional view of the example lower link 408 of the example landing gear 400 of FIG. 4 in a second example position 502 relative to the example upper strut inner cylinder 402 of the example landing gear 400. The first position 418 of the lower link 408 corresponds to a position of the lower link 408 following (e.g., immediately after) separation of the wheel 410 from the ground during takeoff of an aircraft implementing the landing gear 400 (e.g., the aircraft 100 of FIG. 1), and prior to the initiation of a retract braking process to be applied to the wheel 410 of the landing gear 400. The second position 502 of the lower link 408 corresponds to a position of the lower link 408 following completion of the retract braking process.

When the lower link 408 is in the first position 418 shown in FIG. 4, the wheel 410 rotates and/or spins at a first rate (e.g., 1800 rpm) in a first example direction 420 (e.g., clockwise) about the first end 412 of the lower link 408. Application of the retract braking process (e.g., via the hydraulic retract braking system 300 of FIG. 3) to the wheel 410 causes the rate of rotation and/or spinning of the wheel 410 to be reduced such that the wheel 410 is decelerated and/or despun from the first rate to a second rate (e.g., 0 rpm). As the retract braking process occurs, the deceleration and/or despin of the wheel 410 from the first rate to the second rate generates an example applied moment 422 that causes the lower link 408 to move in the first direction 420 from the first position 418 of FIG. 4 to the second position 502 of FIG. 5. When the retract braking process is complete, the lower link 408 returns and/or rebounds in a second example direction 504 (e.g., counterclockwise) opposite the first direction 420 from the second position 502 of FIG. 5 to the first position 418 of FIG. 4.

Figure 6:
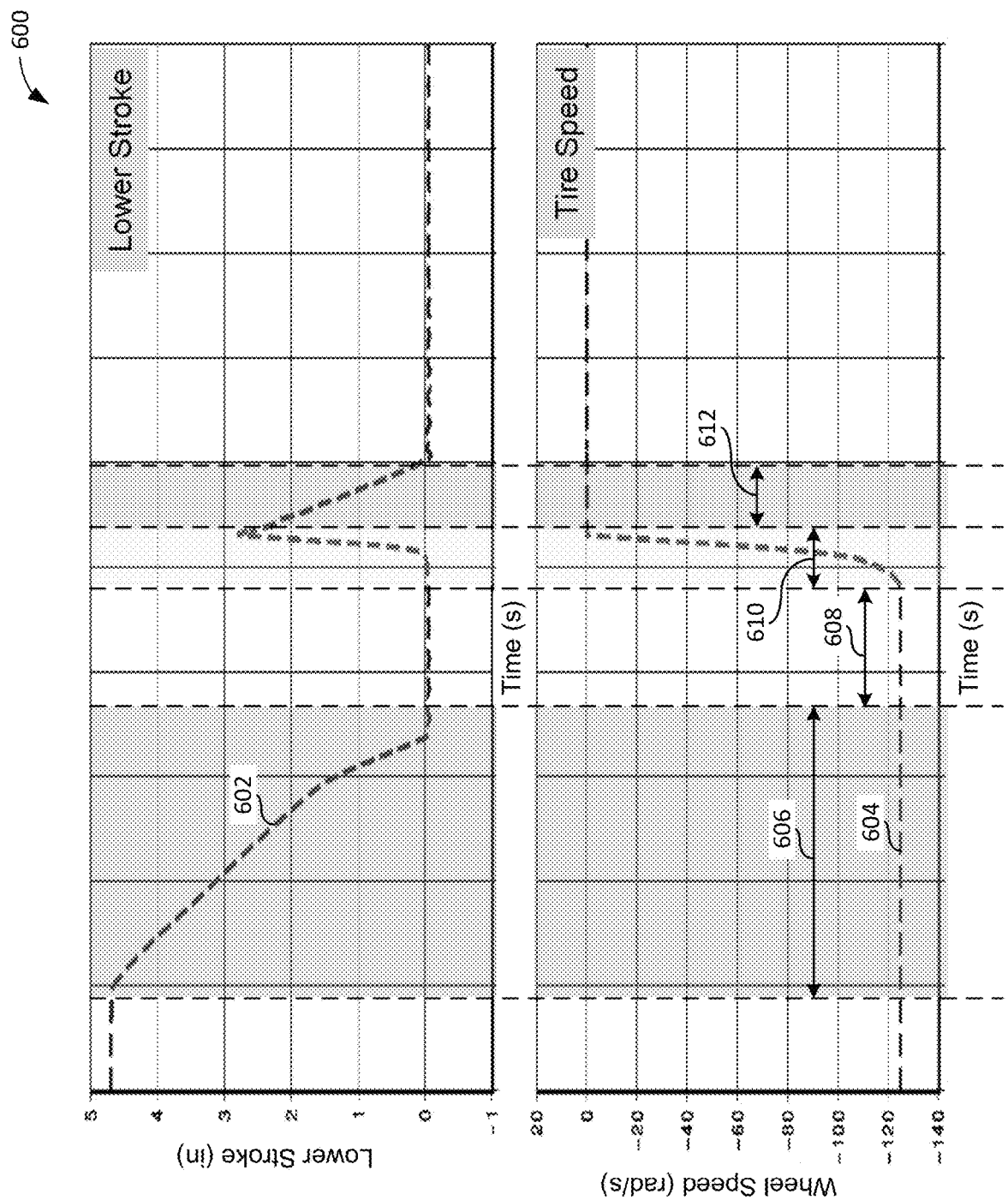
FIG. 6 is an example graph including a first example plot of strut stroke versus time and a second example plot of wheel speed versus time.

FIG. 6 is an example graph 600 including a first example plot 602 of strut stroke versus time and a second example plot 604 of wheel speed versus time. The time axis includes an example takeoff period 606, an example evaluation period 608 following the takeoff period 606, an example retract braking period 610 following the evaluation period 608, and an example rebound period 612 following the retract braking period 610. The duration(s) and/or relative timing of respective ones of the takeoff period 606, the evaluation period 608, the retract braking period 610, and/or the rebound period 612 may differ from that shown in the graph 600 of FIG. 6.

In the illustrated example of FIG. 6, the transition between the end of the takeoff period 606 and the beginning of the evaluation period 608 is indicative of the point in time at which a transition from ground mode to air mode occurs (e.g., the point in time at which the wheels of the aircraft are no longer in contact with the ground surface). The transition between the end of the evaluation period 608 and the beginning of the retract braking period 610 is indicative of the point in time at which the landing gear lever of the aircraft is moved from the gear "DOWN" position into the gear "UP" position. The evaluation period 608 accordingly corresponds to the human and/or pilot response time associated with ascertaining (e.g., physically determining) that the aircraft is airborne (e.g., that no landing gear of the aircraft is in contact with a ground surface and a positive rate of climb has been established) and thereafter actuating the landing gear lever into the gear "UP" position. In some examples, the evaluation period 608 of FIG. 6 may have a duration of three seconds or more.

As shown in the first plot 602 of the illustrated example of FIG. 6, the strut stroke decreases from a maximum value to a minimum value during the takeoff period 606. The strut stroke maintains the minimum value during the evaluation period 608. The strut stroke increases from the minimum value to an increased value during the retract braking period 610. The strut stroke returns from the increased value to the minimum value during the rebound period 612. Repeated cycling of the strut stroke from the minimum value to the increased value and back to the minimum value may fatigue the struts and/or links of the landing gear (e.g., the lower strut 404 and/or the lower link 408 of the landing gear 400 of FIG. 4). Furthermore, the struts, links, and/or wheels may be misaligned relative to a well of an aircraft (e.g., the wells 114, 116 of the aircraft 100 of FIG. 1) prior to the end of the rebound period 612 of FIG. 6.

As further shown in the second plot 604 of the illustrated example of FIG. 6, the wheel speed maintains a maximum value during the takeoff period 606. The wheel speed further maintains the maximum value during the evaluation period 608. The wheel speed decreases from the maximum value to a minimum value during the retract braking period 610. The wheel speed maintains the minimum value during the rebound period 612. In the illustrated example of FIG. 6, the initiation of the deceleration of the wheel of the landing gear (e.g., the wheel 410 of the landing gear 400 of FIG. 4) does not begin until the evaluation period 608 has concluded.

Figure 7:
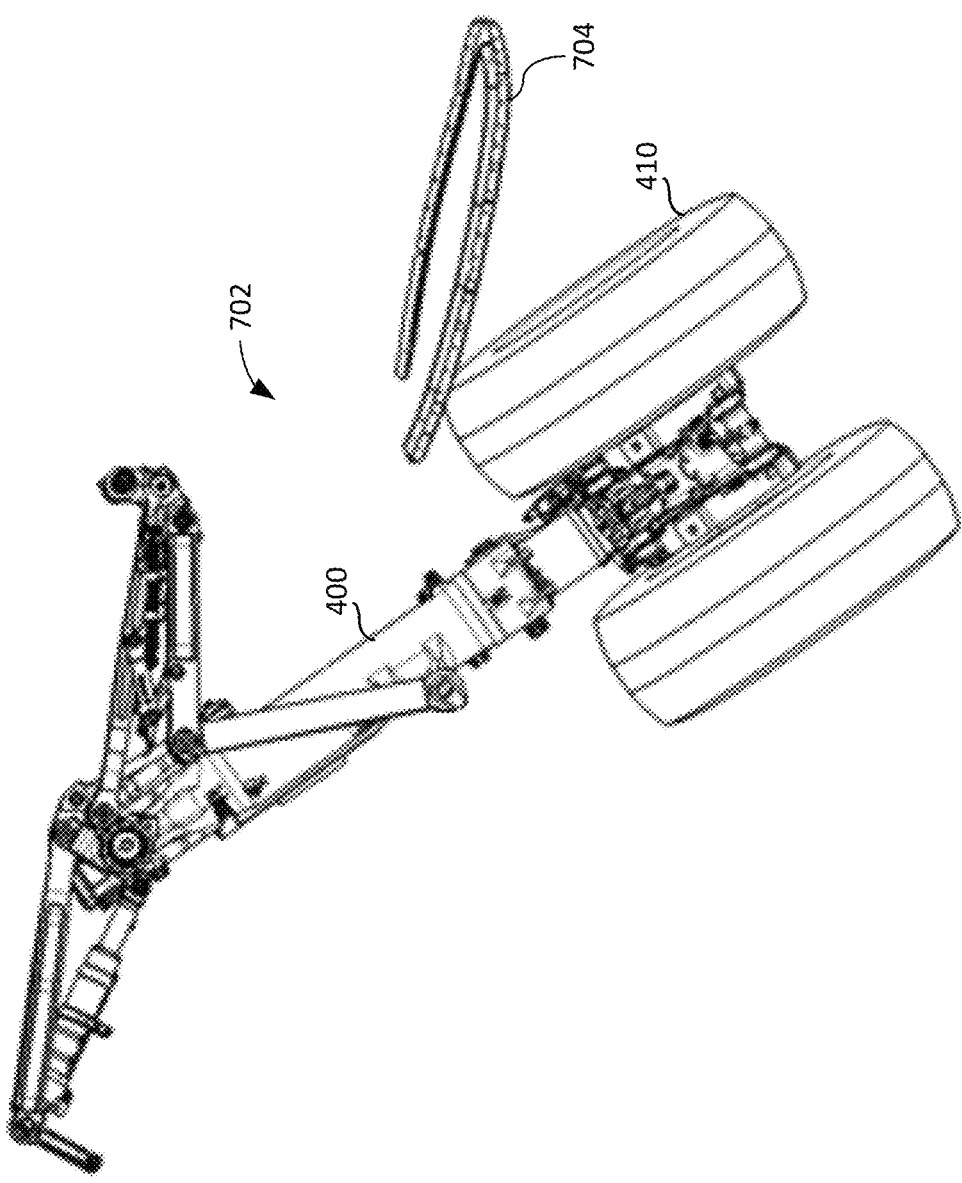
FIG. 7 illustrates the example landing gear of FIGS. 4 and 5 in an example partially retracted position associated with an example landing gear retraction process.

FIG. 7 illustrates the example landing gear 400 of FIGS. 4 and 5 in an example partially retracted position 702 associated with an example landing gear retraction process. In the illustrated example of FIG. 7, the partially retracted position 702 corresponds to a position at which the wheel 410 of the landing gear 400 reaches an example fairing 704 surrounding a well of an aircraft (e.g., a wing-to-body fairing surrounding the well 114 of the aircraft 100) as the landing gear 400 moves from a deployed position (e.g., the deployed position 202 of FIG. 2) to a retracted position (e.g., the retracted position 204 of FIG. 2).

In some examples, it may be desirable for completion of the retract braking process discussed above in connection with FIGS. 3-6 to occur before the wheel 410 of the landing gear 400 reaches the fairing 704 of FIG. 7. For example, if the wheel 410 of the landing gear 400 remains spinning as the wheel 410 reaches the fairing 704, flailing tread and/or carcass of the wheel 410 associated with the spinning may collide with the fairing 704, potentially causing damage to the wheel 410 and/or the fairing 704. Furthermore, vibration associated with the prolonged spinning of an unevenly worn tire of the wheel 410 may result in undesirable noise and/or vibration in a cabin of the aircraft (e.g., an area where passengers may be seated). In some examples, it may also be desirable for the lower link 408 of the landing gear 400 to return and/or rebound from the second position 502 of FIG. 5 to the first position 418 of FIG. 4 before the wheel 410 of the landing gear 400 reaches the fairing 704 of FIG. 7. For example, if the wheel 410 of the landing gear 400 has not fully returned and/or rebounded as the wheel 410 reaches the fairing 704, the out of position wheel 410 may collide with the fairing 704, potentially causing damage to a tire of the wheel 410 and/or to the fairing 704. It may accordingly be advantageous for the retract braking and rebound processes described above in connection with FIGS. 3-6 to be complete before the wheel 410 of the landing gear 400 reaches the fairing 704 of FIG. 7.

The example retract braking control systems disclosed herein provide for automated control of the retract braking of the first set of wheels 108 of the LMLG 106 and/or the second set of wheels 112 of the RMLG 110 of the aircraft 100 of FIG. 1. Automating the retract braking of the first and second sets of wheels 108, 112 advantageously advances the initiation of the retract braking process to an earlier time following takeoff of the aircraft 100 than would otherwise be the case. For example, in response to determining that certain takeoff criteria associated with the aircraft 100 of FIG. 1 have been satisfied, the disclosed retract braking control systems may automatically initiate the retract braking of the first and second sets of wheels 108, 112 of FIG. 1 at a time prior to the landing gear lever of the aircraft 100 of FIG. 1 being manually actuated into the up position.

Advancing the initiation of the retract braking process advantageously enables the retract braking process to be completed at an earlier time relative to the timing of the landing gear retraction process. Advancing the initiation of the retract braking process additionally or alternatively enables the rate of deceleration and/or despin applied to the first and second sets of wheels 108, 112 to be decreased to advantageously reduce the extent of the applied deceleration moment and the resulting rebound that may otherwise be more significant when the deceleration and/or despin is/are required to occur within a shorter time period. The disclosed retract braking control systems accordingly reduce the likelihood of the first set of wheels 108 of the LMLG 106 and/or the second set of wheels 112 of the RMLG 110 of the aircraft 100 of FIG. 1 colliding with wing-to-body fairings surrounding the wells 114, 116 of the aircraft 100 of FIG. 1 in connection with the landing gear retraction process. The disclosed retract braking control systems also reduce fatigue on the struts and/or links of the LMLG 106 and the RMLG 110.

Figure 8:
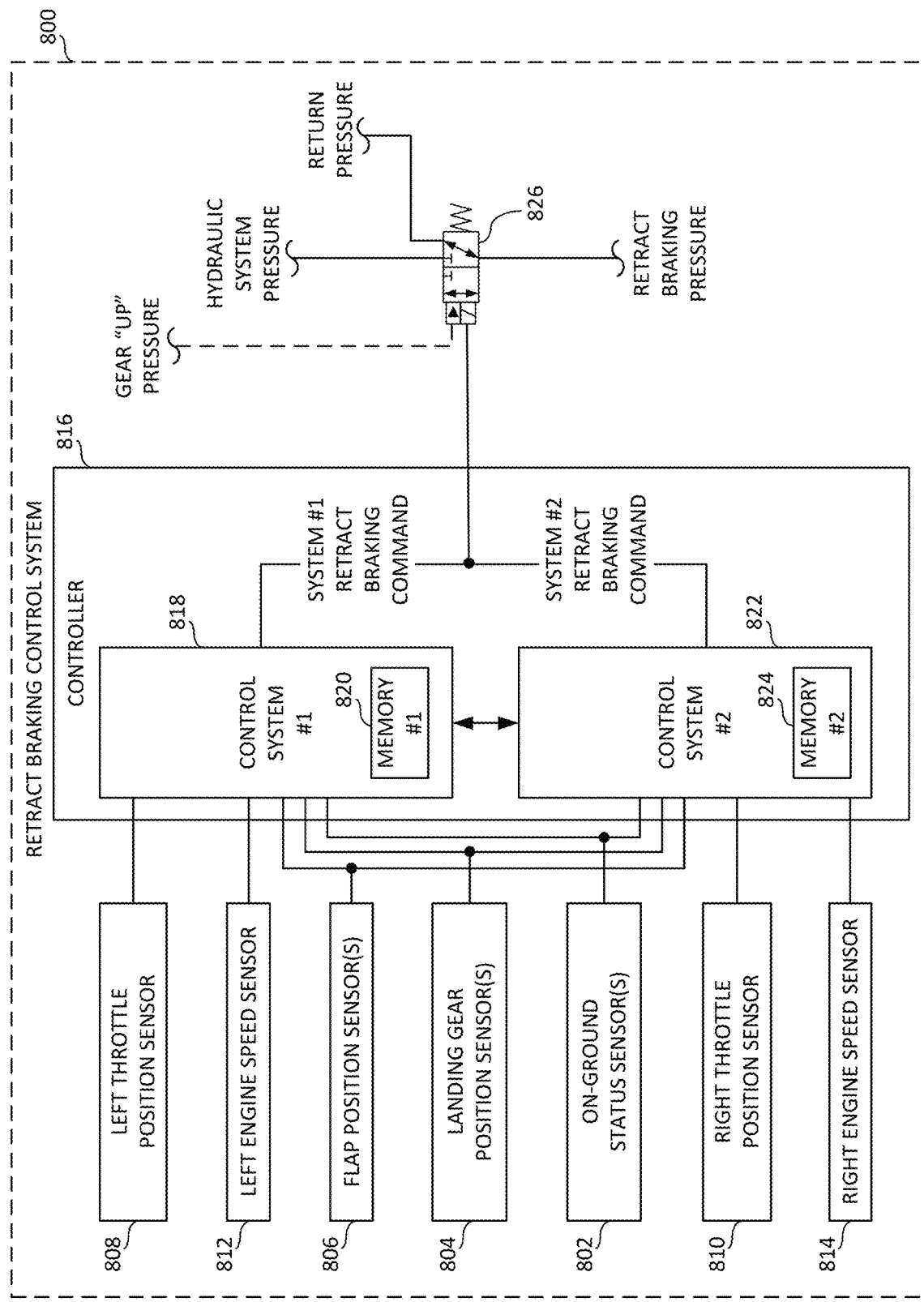
FIG. 8 is a block diagram of a first example retract braking control system constructed in accordance with the teachings of this disclosure.

FIG. 8 is a block diagram of a first example retract braking control system 800 constructed in accordance with the teachings of this disclosure. The retract braking control system 800 of FIG. 8 includes one or more example on-ground sensor(s) 802, one or more example landing gear position sensor(s) 804, one or more example flap position sensor(s) 806, an example left throttle position sensor 808, an example right throttle position sensor 810, an example left engine speed sensor 812, an example right engine speed sensor 814, an example controller 816, a first example control system 818, a first example memory 820, a second example control system 822, a second example memory 824, and an example retract braking control valve (RBCV) 826.

In the illustrated example of FIG. 8, respective ones of the on-ground sensor(s) 802, the landing gear position sensor(s) 804, the flap position sensor(s) 806, the left throttle position sensor 808, and the left engine speed sensor 812 of FIG. 8 are operatively coupled to the first control system 818, and/or, more generally, to the controller 816 of FIG. 8. Respective ones of the on-ground sensor(s) 802, the landing gear position sensor(s) 804, the flap position sensor(s) 806, the right throttle position sensor 810, and the right engine speed sensor 814 of FIG. 8 are operatively coupled to the second control system 822, and/or, more generally, to the controller 816 of FIG. 8. The first control system 818 of FIG. 8 is operatively coupled to the second control system 822 of FIG. 8. The RBCV 826 of FIG. 8 is operatively coupled to the first control system 818 and the second control system 822, and/or, more generally, to the controller 816 of FIG. 8.

The on-ground sensor(s) 802 of FIG. 8 sense(s) and/or detect(s) whether the first set of wheels 108 of the LMLG 106 of FIG. 1 and/or the second set of wheels 112 of the RMLG 110 of FIG. 1 is/are in contact with a ground surface such as a runway (e.g., on-ground status data). For example, the first set of wheels 108 of FIG. 1 may be coupled to a structural member (e.g., a shock strut) of the LMLG 106 of FIG. 1 via a shock absorber that expands and/or elongates as the weight of the aircraft 100 of FIG. 1 is removed from the first set of wheels 108 in connection with the aircraft 100 leaving the ground (e.g., during takeoff). In such an example, the first set of wheels 108 may be spaced at a first distance from the structural member of the LMLG 106 when the first set of wheels 108 are in contact with a ground surface, and may be spaced at a second distance from the structural member of the LMLG 106 greater than the first distance when the first set of wheels 108 are not in contact with the ground surface. In such an example, one or more of the on-ground sensor(s) 802 of FIG. 8 associated with the first set of wheels 108 of the LMLG 106 may be implemented as a proximity sensor that senses and/or detects the position of the first set of wheels 108 of the LMLG 106 of FIG. 1 relative to the structural member of the LMLG 106.

The on-ground sensor(s) 802 of FIG. 8 is/are located, mounted on, and/or otherwise structurally coupled to the LMLG 106 or the RMLG 110 of FIG. 1, and is/are operatively coupled to the first control system 818, the first memory 820, the second control system 822, the second memory 824, and/or, more generally, the controller 816 of FIG. 8. On-ground status data sensed and/or detected by the on-ground sensor(s) 802 of FIG. 8 may be stored in the first memory 820 and/or the second memory 824 of FIG. 8, and may be accessed by the first control system 818, by the second control system 524, and/or, more generally, by the controller 816 of FIG. 8 either from the first memory 820 or the second memory 824 of FIG. 8, or directly from the on-ground sensor(s) 802 of FIG. 8. In some examples, the on-ground sensor(s) 802 of FIG. 8 may constantly sense and/or constantly detect the on-ground status data. In other examples, the on-ground sensor(s) 802 of FIG. 8 may periodically sense and/or periodically detect the on-ground status data based on a timing interval and/or a sampling frequency implemented via the first control system 818, the second control system 822, and/or the controller 816 of FIG. 8.

The landing gear position sensor(s) 804 of FIG. 8 sense and/or detect the position(s) (e.g., gear(s) deployed or gear(s) retracted) of the LMLG 106 and/or the RMLG 110 of FIG. 1, and/or whether the LMLG 106 and/or the RMLG 110 is/are locked (e.g., landing gear position data). For example, the LMLG 106 of FIG. 1 may include lock members (e.g., lock struts, rods, shafts, and/or links) that may be moved to, positioned in, and/or secured in a locked position associated with the LMLG 106. In such an example, a first one of the lock members may be spaced at a first distance from a second one of the lock members and/or another structural member (e.g., a shock strut) of the LMLG 106 of FIG. 1 when the LMLG 106 is locked and/or when the LMLG is retracted, and may be spaced at a second distance from the second one of the lock members and/or the other structural member of the LMLG 106 when the LMLG 106 is not locked and/or not retracted. In such an example, one or more of the landing gear position sensor(s) 804 of FIG. 8 associated with the LMLG 106 may be implemented as a proximity sensor that senses and/or detects the position of the first one of the lock members of the LMLG 106 relative to the second one of the lock members and/or the other structural member of the LMLG 106.

The landing gear position sensor(s) 804 of FIG. 8 is/are located, mounted on, and/or otherwise structurally coupled to the LMLG 106 or the RMLG 110 of FIG. 1, and is/are operatively coupled to the first control system 818, the first memory 820, the second control system 822, the second memory 824, and/or, more generally, the controller 816 of FIG. 8. Landing gear position data sensed and/or detected by the landing gear position sensor(s) 804 of FIG. 8 may be stored in the first memory 820 and/or the second memory 824 of FIG. 8, and may be accessed by the first control system 818, by the second control system 524, and/or, more generally, by the controller 816 of FIG. 8 either from the first memory 820 or the second memory 824 of FIG. 8, or directly from the landing gear position sensor(s) 804 of FIG. 8. In some examples, the landing gear position sensor(s) 804 of FIG. 8 may constantly sense and/or constantly detect the landing gear position data. In other examples, the landing gear position sensor(s) 804 of FIG. 8 may periodically sense and/or periodically detect the landing gear position data based on a timing interval and/or a sampling frequency implemented via the first control system 818, the second control system 822, and/or the controller 816 of FIG. 8.

The flap position sensor(s) 806 of FIG. 8 sense, measure and/or detect a position (e.g., a detent position) of a flap of the aircraft 100 of FIG. 1 (e.g., flap position data). The flap position sensor(s) 806 of FIG. 8 may be operatively coupled to a flap lever located within a cockpit of the aircraft 100 of FIG. 1, and may also operatively coupled to the first control system 818, the first memory 820, the second control system 822, the second memory 824, and/or, more generally, the controller 816 of FIG. 8. In other examples, the flap position sensor(s) may be coupled to flaps of the wings of the aircraft 100. Flap position data sensed, measured and/or detected by the flap position sensor(s) 806 of FIG. 8 may be stored in the first memory 820 and/or the second memory 824 of FIG. 8, and may be accessed by the first control system 818, by the second control system 822, and/or, more generally, by the controller 816 of FIG. 8 from either the first memory 820 or the second memory 824 of FIG. 8, or directly from the flap position sensor(s) 806 of FIG. 8. In some examples, the flap position sensor(s) 806 of FIG. 8 may constantly sense and/or constantly detect the flap position data. In other examples, the flap position sensor(s) 806 of FIG. 8 may periodically sense and/or periodically detect the flap position data based on a timing interval and/or a sampling frequency implemented via the first control system 818, the second control system 822, and/or the controller 816 of FIG. 8.

The left throttle position sensor 808 of FIG. 8 senses, measures and/or detects a position (e.g., an angular position and/or angular displacement) of a left throttle of the aircraft 100 of FIG. 1 (e.g., left throttle position data). In some examples, the left throttle position sensor 808 of FIG. 8 may sense and/or detect whether the position of the left throttle exceeds a throttle position threshold (e.g., throttle position threshold data). In some examples, the left throttle position sensor 808 of FIG. 8 is operatively coupled to a left throttle (e.g., a left throttle lever) located within a cockpit of the aircraft 100 of FIG. 1, and is also operatively coupled to the first control system 818, the first memory 820, and/or, more generally, the controller 816 of FIG. 8. Left throttle position data sensed, measured and/or detected by the left throttle position sensor 808 of FIG. 8 may be stored in the first memory 820 of FIG. 8, and may be accessed by the first control system 818 and/or, more generally, by the controller 816 of FIG. 8 either from the first memory 820 of FIG. 8 or directly from the left throttle position sensor 808 of FIG. 8. In some examples, the left throttle position sensor 808 of FIG. 8 may constantly sense and/or constantly detect the left throttle position data. In other examples, the left throttle position sensor 808 of FIG. 8 may periodically sense and/or periodically detect the left throttle position data based on a timing interval and/or a sampling frequency implemented via the first control system 818 and/or the controller 816 of FIG. 8.

The right throttle position sensor 810 of FIG. 8 senses, measures and/or detects a position (e.g., an angular position and/or angular displacement) of a right throttle of the aircraft 100 of FIG. 1 (e.g., right throttle position data). In some examples, the right throttle position sensor 810 of FIG. 8 may sense and/or detect whether the position of the right throttle exceeds a throttle position threshold (e.g., throttle position threshold data). In some examples, the right throttle position sensor 810 of FIG. 8 is operatively coupled to a right throttle (e.g., a right throttle lever) located within a cockpit of the aircraft 100 of FIG. 1, and is also operatively coupled to the second control system 822, the second memory 824, and/or, more generally, the controller 816 of FIG. 8. Right throttle position data sensed, measured and/or detected by the right throttle position sensor 810 of FIG. 8 may be stored in the second memory 824 of FIG. 8, and may be accessed by the second control system 822 and/or, more generally, by the controller 816 of FIG. 8 either from the second memory 824 of FIG. 8 or directly from the right throttle position sensor 810 of FIG. 8. In some examples, the right throttle position sensor 810 of FIG. 8 may constantly sense and/or constantly detect the right throttle position data. In other examples, the right throttle position sensor 810 of FIG. 8 may periodically sense and/or periodically detect the right throttle position data based on a timing interval and/or a sampling frequency implemented via the second control system 822 and/or the controller 816 of FIG. 8.

The left engine speed sensor 812 of FIG. 8 senses, measures and/or detects a speed (e.g., an angular and/or rotational velocity) of the left engine 118 of the aircraft 100 of FIG. 1 (e.g., left engine speed data). In some examples, the left engine speed sensor 812 of FIG. 8 may sense and/or detect whether the speed of the left engine exceeds an engine speed threshold (e.g., engine speed threshold data). The left engine speed sensor 812 of FIG. 8 is operatively coupled to the left engine 118 of the aircraft 100 of FIG. 1, and is also operatively coupled to the first control system 818, the first memory 820, and/or, more generally, the controller 816 of FIG. 8. Left engine speed data sensed, measured and/or detected by the left engine speed sensor 812 of FIG. 8 may be stored in the first memory 820 of FIG. 8, and may be accessed by the first control system 818 and/or, more generally, by the controller 816 of FIG. 8 either from the first memory 820 of FIG. 8 or directly from the left engine speed sensor 812 of FIG. 8. In some examples, the left engine speed sensor 812 of FIG. 8 may constantly sense and/or constantly detect the left engine speed data. In other examples, the left engine speed sensor 812 of FIG. 8 may periodically sense and/or periodically detect the left engine speed data based on a timing interval and/or a sampling frequency implemented via the first control system 818 and/or the controller 816 of FIG. 8.

The right engine speed sensor 814 of FIG. 8 senses, measures and/or detects a speed (e.g., an angular and/or rotational velocity) of the right engine 120 of the aircraft 100 of FIG. 1 (e.g., right engine speed data). In some examples, the right engine speed sensor 814 of FIG. 8 may sense and/or detect whether the speed of the right engine exceeds an engine speed threshold (e.g., engine speed threshold data). The right engine speed sensor 814 of FIG. 8 is operatively coupled to the right engine 120 of the aircraft 100 of FIG. 1, and is also operatively coupled to the second control system 822, the second memory 824, and/or, more generally, the controller 816 of FIG. 8. Right engine speed data sensed, measured and/or detected by the right engine speed sensor 814 of FIG. 8 may be stored in the second memory 824 of FIG. 8, and may be accessed by the second control system 822 and/or, more generally, by the controller 816 of FIG. 8 either from the second memory 824 of FIG. 8 or directly from the right engine speed sensor 814 of FIG. 8. In some examples, the right engine speed sensor 814 of FIG. 8 may constantly sense and/or constantly detect the right engine speed data. In other examples, the right engine speed sensor 814 of FIG. 8 may periodically sense and/or periodically detect the right engine speed data based on a timing interval and/or a sampling frequency implemented via the second control system 822 and/or the controller 816 of FIG. 8.

The controller 816 of FIG. 8 may be implemented by a semiconductor device such as a processor, microprocessor, controller or microcontroller. In the illustrated example of FIG. 8, the controller 816 manages and/or controls the RBCV 826 of FIG. 8 based on on-ground status data, landing gear position data, flap position data, left throttle position data, right throttle position data, left engine speed data, and/or right engine speed data received, obtained and/or accessed by the controller 816 from the first control system 818 and/or the second control system 822 of FIG. 8. The first control system 818 and the second control system 822 of FIG. 8 are redundant control systems capable of exchanging data with one another and/or with the controller 816 of FIG. 8.

The first control system 818 of FIG. 8 determines whether the first set of wheels 108 of the LMLG 106 and/or the second set of wheels 112 of the RMLG 110 of FIG. 1 is/are in contact with a ground surface based on the on-ground status data sensed and/or detected via the on-ground sensor(s) 802 of FIG. 8. The first control system 818 determines whether the LMLG 106 and/or the RMLG 110 of FIG. 1 is/are in a retracted position, and/or whether the LMLG 106 and/or the RMLG 110 of FIG. 1 is/are locked, based on the landing gear position data sensed and/or detected via the landing gear position sensor(s) 804 of FIG. 8. The first control system 818 determines a position of the flaps of the aircraft 100 of FIG. 1 based on flap position data sensed and/or detected via the flap position sensor(s) 806 of FIG. 8. In some examples, the first control system 818 may determine whether the flap position data is indicative of the wing flaps of the aircraft 100 of FIG. 1 being in a takeoff position.

The first control system 818 of FIG. 8 determines a position of a left throttle of the aircraft 100 of FIG. 1 based on left throttle position data sensed and/or detected via the left throttle position sensor 808 of FIG. 8. In some examples, the first control system 818 may determine whether the left throttle position data exceeds a throttle position threshold. The first control system 818 determines a speed of the left engine 118 of FIG. 1 based on left engine speed data sensed and/or detected via the left engine speed sensor 812 of FIG. 8. In some examples, the first control system 818 may determine whether the left engine speed data exceeds an engine speed threshold.

The first memory 820 of FIG. 8 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the first memory 820 may be stored in any file and/or data structure format, organization scheme, and/or arrangement.

Data and/or information received by the first control system 818 and/or, more generally, by the controller 816 of FIG. 8 from the on-ground sensor(s) 802, the landing gear position sensor(s) 804, the flap position sensor(s) 806, the left throttle position sensor 808, and/or the left engine speed sensor 812 of FIG. 8 may be stored in the first memory 820 of FIG. 8. Data and/or information corresponding to any of the above-described on-ground status data, landing gear position data, flap position data, left throttle position data, throttle position threshold data, left engine speed data, and/or engine speed threshold data may be stored in the first memory 820. Data and/or information stored in the first memory 820 is accessible to the first control system 818 and/or, more generally, to the controller 816 of FIG. 8. In some examples, data and/or information stored in the first memory 820 may be transferred to the second memory 824 of FIG. 8.

The second control system 822 of FIG. 8 determines whether the first set of wheels 108 of the LMLG 106 and/or the second set of wheels 112 of the RMLG 110 of FIG. 1 is/are in contact with a ground surface based on the on-ground status data sensed and/or detected via the on-ground sensor(s) 802 of FIG. 8. The second control system 822 determines whether the LMLG 106 and/or the RMLG 110 of FIG. 1 is/are in a retracted position, and/or whether the LMLG 106 and/or the RMLG 110 of FIG. 1 is/are locked, based on the landing gear position data sensed and/or detected via the landing gear position sensor(s) 804 of FIG. 8. The second control system 822 determines a position of the flaps of the aircraft 100 of FIG. 1 based on flap position data sensed and/or detected via the flap position sensor(s) 806 of FIG. 8. In some examples, the second control system 822 may determine whether the flap position data is indicative of the wing flaps of the aircraft 100 of FIG. 1 being in a takeoff position.

The second control system 822 of FIG. 8 determines a position of a right throttle of the aircraft 100 of FIG. 1 based on right throttle position data sensed and/or detected via the right throttle position sensor 810 of FIG. 8. In some examples, the second control system 822 may determine whether the right throttle position data exceeds a throttle position threshold. The second control system 822 determines a speed of the right engine 120 of FIG. 1 based on right engine speed data sensed and/or detected via the right engine speed sensor 814 of FIG. 8. In some examples, the second control system 822 may determine whether the right engine speed data exceeds an engine speed threshold.

The second memory 824 of FIG. 8 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the second memory 824 may be stored in any file and/or data structure format, organization scheme, and/or arrangement.

Data and/or information received by the second control system 822 and/or, more generally, by the controller 816 of FIG. 8 from the on-ground sensor(s) 802, the landing gear position sensor(s) 804, the flap position sensor(s) 806, the right throttle position sensor 810, and/or the right engine speed sensor 814 of FIG. 8 may be stored in the second memory 824 of FIG. 8. Data and/or information corresponding to any of the above-described on-ground status data, landing gear position data, flap position data, right throttle position data, throttle position threshold data, right engine speed data, and/or engine speed threshold data may be stored in the second memory 824. Data and/or information stored in the second memory 824 is accessible to the second control system 822 and/or, more generally, to the controller 816 of FIG. 8. In some examples, data and/or information stored in the second memory 824 may be transferred to the first memory 820 of FIG. 8.

The first control system 818 and/or, more generally, the controller 816 of FIG. 8 generates one or more control signal(s) and/or command(s) to initiate retract braking of the first set of wheels 108 of the LMLG 106 and/or the second set of wheels 112 of the RMLG 110 of FIG. 1 based on the above-described data received at the first control system 818 and/or stored in the first memory 820. An example control logic diagram to be executed and/or otherwise implemented via the first control system 818 and/or, more generally, the controller 816 of FIG. 8 to generate control signal(s) and/or command(s) to initiate retract braking of the first set of wheels 108 of the LMLG 106 and/or the second set of wheels 112 of the RMLG 110 of FIG. 1 is described below in connection with FIG. 10. As shown in the illustrated example of FIG. 8, a retract braking command corresponding to the control signal(s) generated via the first control system 818 and/or the controller 816 of FIG. 8 is transmitted, conveyed, and/or otherwise relayed from the first control system 818 and/or the controller 816 of FIG. 8 to the RBCV 826 of FIG. 8. The RBCV 826 is actuated in response to the retract braking command to initiate retract braking of the first set of wheels 108 of the LMLG 106 and/or the second set of wheels 112 of the RMLG 110 of FIG. 1.

The second control system 822 and/or, more generally, the controller 816 of FIG. 8 also generates one or more control signal(s) and/or command(s) to initiate retract braking of the first set of wheels 108 of the LMLG 106 and/or the second set of wheels 112 of the RMLG 110 of FIG. 1 based on the above-described data received at the second control system 822 and/or stored in the second memory 824. An example control logic diagram to be executed and/or otherwise implemented via the second control system 822 and/or, more generally, the controller 816 of FIG. 8 to generate control signal(s) and/or command(s) to initiate retract braking of the first set of wheels 108 of the LMLG 106 and/or the second set of wheels 112 of the RMLG 110 of FIG. 1 is described below in connection with FIG. 10. As shown in the illustrated example of FIG. 8, a retract braking command corresponding to the control signal(s) generated via the second control system 822 and/or the controller 816 of FIG. 8 is transmitted, conveyed, and/or otherwise relayed from the second control system 822 and/or the controller 816 of FIG. 8 to the RBCV 826 of FIG. 8.

A flow control member of the RBCV 826 of FIG. 8 is movable and/or actuatable between the first control position shown in FIG. 8 and a second control position. The flow control member of the RBCV 826 is biased into the first control position shown in FIG. 8. When the flow control member of the RBCV 826 is in the first control position, hydraulic system pressure is blocked from passing through the RBCV 826 to a retract braking pressure conduit, and the retract braking pressure conduit is instead ported to a return pressure conduit. When the flow control member of the RBCV 826 is in the second control position, the hydraulic system pressure passes through the RBCV 826 into the retract braking pressure conduit to supply pressurized hydraulic fluid to a hydraulic retract braking system (e.g., the hydraulic retract braking system 300 of FIG. 3). Moving and/or actuating the RBCV 826 of FIG. 8 into the second control position initiates retract braking of the first set of wheels 108 of the LMLG 106 and/or the second set of wheels 112 of the RMLG 110 of FIG. 1.

In some examples, the flow control member of the RBCV 826 may be hydraulically moved and/or actuated from the first control position to the second control position in response to a gear "UP" pressure being provided to the RBCV 826. The gear "UP" pressure may be provided to the RBCV 826 in response to a landing gear lever of the aircraft 100 of FIG. 1 being moved into a gear "UP" position following takeoff of the aircraft 100. As discussed above, pilot-initiated movement of the landing gear lever into the gear "UP" position typically occurs at a time that is approximately three seconds after the time at which the wheels of the aircraft 100 of FIG. 1 are no longer in contact with a ground surface (e.g., three seconds after the time at which the aircraft 100 first becomes airborne). The retract braking control system 800 of FIG. 8 advantageously provides for automated and/or electronic movement and/or actuation of the RBCV 826. For example, the flow control member of the RBCV 826 may be electronically moved and/or actuated from the first control position to the second control position in response to a retract braking command provided to the RBCV 826 from the first control system 818, the second control system 822, and/or the controller 816 of FIG. 8. In some examples, the automated and/or electronic movement and/or actuation of the RBCV 826 may occur approximately three seconds earlier than the above-described hydraulic movement and/or actuation of the RBCV 826.

Figure 9A:
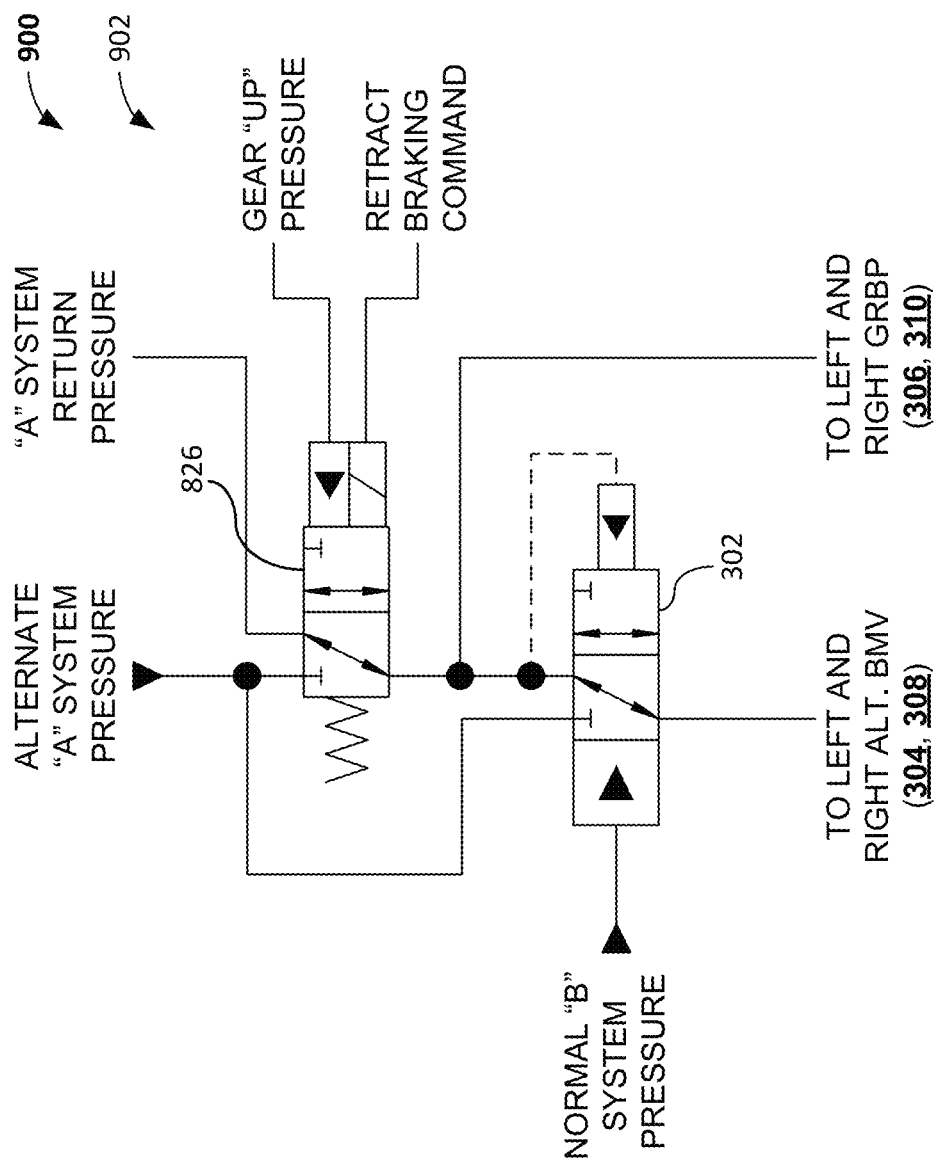
FIG. 9A is a schematic illustrating an example first state of an example modification to the hydraulic retract braking system of FIG. 3 to implement the first example retract braking control system of FIG. 8.
Figure 9B:
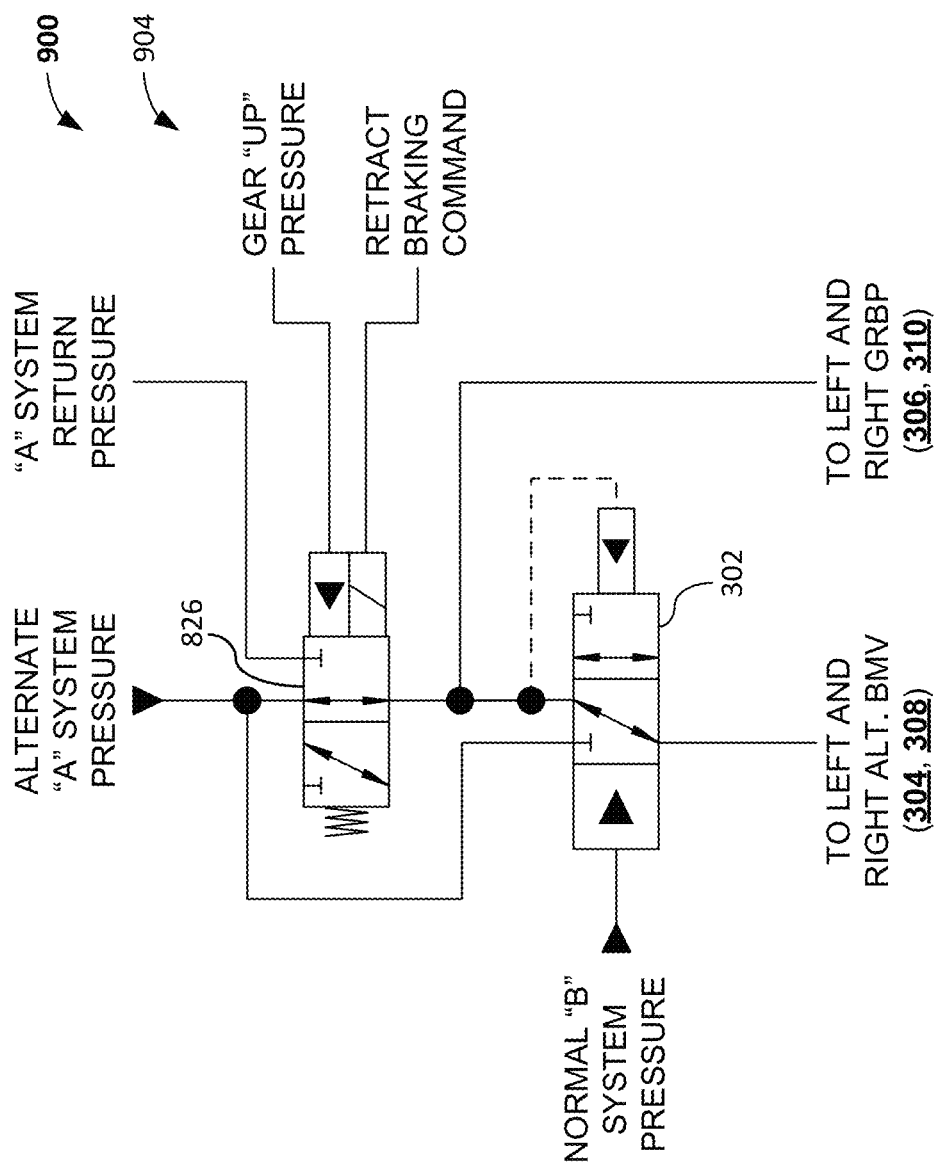
FIG. 9B is a schematic illustrating an example second state of the example modification of FIG. 9A.

FIG. 9A is a schematic illustrating an example first state 902 of an example modification 900 to the hydraulic retract braking system 300 of FIG. 3 to implement the first example retract braking control system 800 of FIG. 8. FIG. 9B is a schematic illustrating an example second state 904 of the example modification 900 of FIG. 9A. The modification 900 of FIGS. 9A and 9B illustrates modified fluid communication pathways and/or porting between the RBCV 826 of FIG. 8 and the ASSV 302 of FIG. 3. In the illustrated example of FIGS. 9A and 9B, the flow control member of the RBCV 826 is hydraulically and/or electrically movable and/or actuatable between the first control position shown in FIG. 9A and the second control position shown in FIG. 9B. The flow control member of the RBCV 826 is mechanically biased into the first control position shown in FIG. 9A.

When the flow control member of the RBCV 826 is in the first control position (e.g., corresponding to the first state 902 of FIG. 9A), hydraulic pressure from the alternate "A" system is blocked from passing through the RBCV 826, and is also blocked from passing through the ASSV 302. The left ALT BMV 304 and the right ALT BMV 308 are ported through the ASSV 302 and through the RBCV 826 to the "A" system return conduit. The left GRBP 306 and the right GRBP 310 are ported through the RBCV 826 to the "A" system return conduit. When the flow control member of the RBCV 826 is in the second control position (e.g., corresponding to the second state 904 of FIG. 9A), hydraulic pressure from the alternate "A" system passes through the RBCV 826 to the left GRBP 306 and the right GRBP 310. The alternate "A" system hydraulic pressure also passes through the ASSV 302 to the left ALT BMV 304 and the right ALT BMV 308. Moving and/or actuating the RBCV 826 of FIGS. 9A and 9B into the second control position initiates retract braking of the first set of wheels 108 of the LMLG 106 and/or the second set of wheels 112 of the RMLG 110 of FIG. 1.

In some examples, the flow control member of the RBCV 826 may be hydraulically moved and/or actuated from the first control position shown in FIG. 9A to the second control position shown in FIG. 9B in response to a gear "UP" pressure being provided to the RBCV 826. The gear "UP" pressure may be provided to the RBCV 826 in response to a landing gear lever of the aircraft 100 of FIG. 1 being moved into a gear "UP" position following takeoff of the aircraft 100. As discussed above, pilot-initiated movement of the landing gear lever into the gear "UP" position typically occurs at a time that is approximately three seconds after the time at which the wheels of the aircraft 100 of FIG. 1 are no longer in contact with a ground surface (e.g., three seconds after the time at which the aircraft 100 first becomes airborne). The retract braking control system 800 of FIGS. 8, 9A and 9B advantageously provides for automated and/or electronic movement and/or actuation of the RBCV 826. For example, the flow control member of the RBCV 826 may be electronically moved and/or actuated from the first control position shown in FIG. 9A to the second control position shown in FIG. 9B in response to a retract braking command provided to the RBCV 826 from the first control system 818, the second control system 822, and/or the controller 816 of FIG. 8. In some examples, the automated and/or electronic movement and/or actuation of the RBCV 826 may occur approximately three seconds earlier than the above-described hydraulic movement and/or actuation of the RBCV 826.

Figure 10:
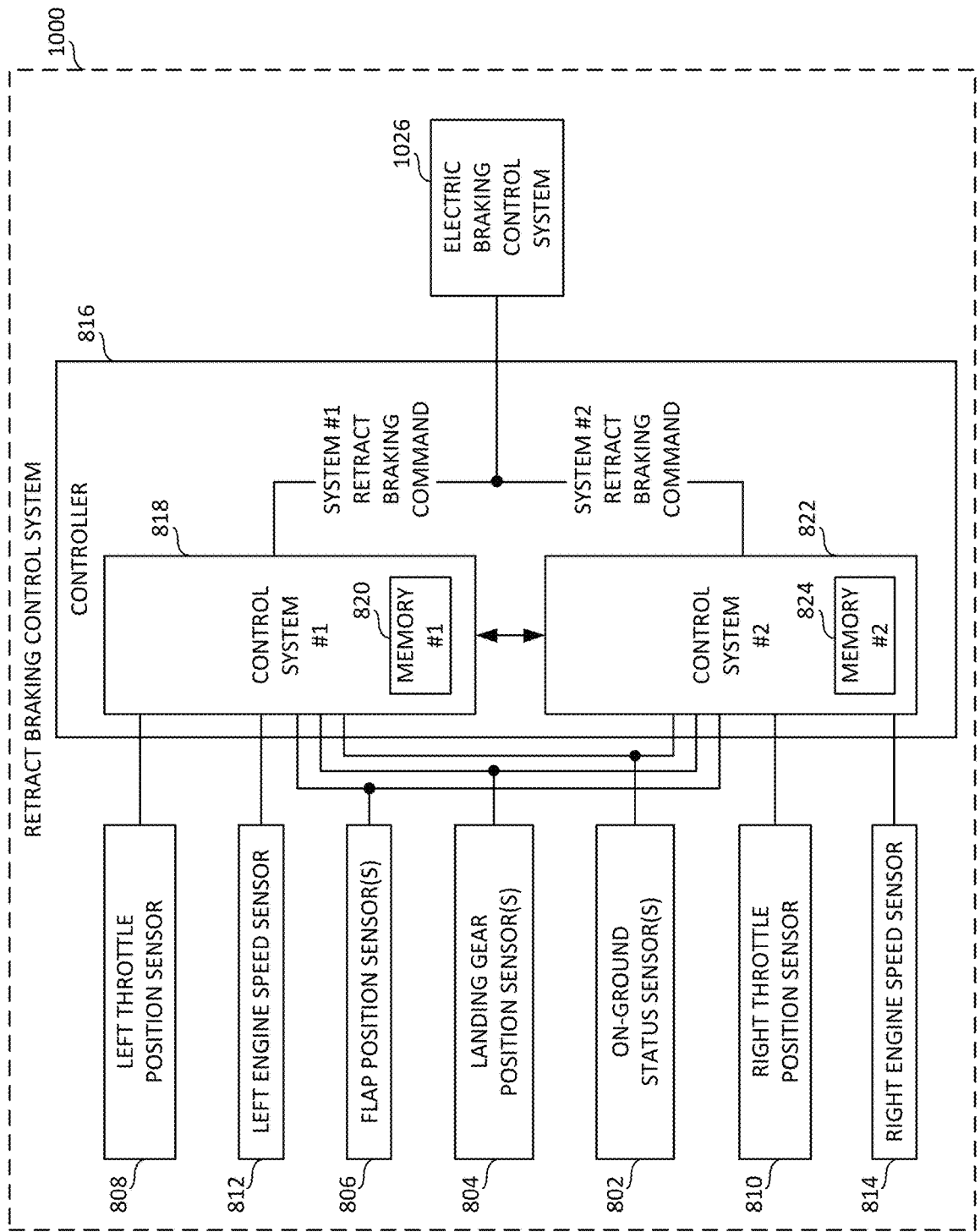
FIG. 10 is a block diagram of a second example retract braking control system constructed in accordance with the teachings of this disclosure.

FIG. 10 is a block diagram of a second example retract braking control system 1000 constructed in accordance with the teachings of this disclosure. In the illustrated example of FIG. 10, the second retract braking control system 1000 includes the on-ground sensor(s) 802, the landing gear position sensor(s) 804, the flap position sensor(s) 806, the left throttle position sensor 808, the right throttle position sensor 810, the left engine speed sensor 812, the right engine speed sensor 814, the controller 816, the first control system 818, the first memory 820, the second control system 822, and the second memory 824 of the first retract braking control system 800 described above.

In contrast to the first retract braking control system 800 of FIG. 8 which included the RBCV 826 to initiate and/or facilitate hydraulic retract braking of the first set of wheels 108 of the LMLG 106 and/or the second set of wheels 112 of the RMLG 110 of FIG. 1, the second retract braking control system 1000 of FIG. 10 instead includes an example electric braking control system 1026 to initiate and/or facilitate electric retract braking of the first set of wheels 108 of the LMLG 106 and/or the second set of wheels 112 of the RMLG 110 of FIG. 1. In the illustrated example of FIG. 10, the electric braking control system 1026 initiates retract braking of the first set of wheels 108 of the LMLG 106 and/or the second set of wheels 112 of the RMLG 110 of FIG. 1 in response to the retract braking command(s) received from the first control system 818, the second control system 822, and/or the controller 816 of FIG. 10.

Figure 11:
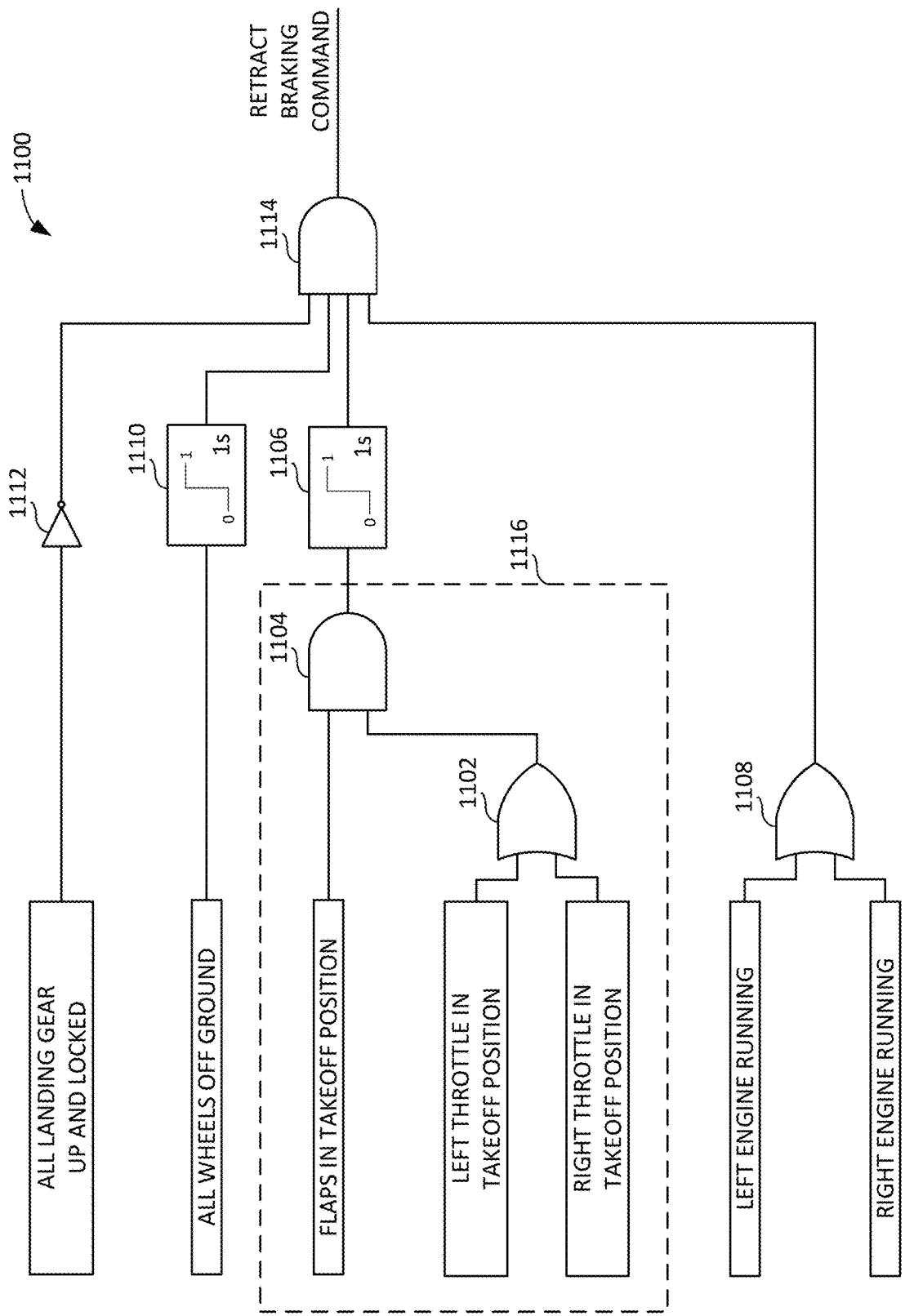
FIG. 11 is an example control logic diagram to be implemented by the example controller of FIGS. 8 and 9 to control landing gear retract braking.

FIG. 11 is an example control logic diagram 1100 to be implemented by the example controller 816 of FIGS. 8 and 10 to control landing gear retract braking. The control logic diagram 1100 of FIG. 11 includes a first example OR gate 1102, a first example AND gate 1104, a first example time delay function 1106, a second example OR gate 1108, a second example time delay function 1110, an example NOT gate 1112, and a second example AND gate 1114 to be implemented via the controller 816 of FIGS. 8 and 10. Each OR gate of the control logic diagram 1100 of FIG. 11 produces a high output (e.g., output=1) if any input is high, and produces a low output (e.g., output=0) if all inputs are low. Each AND gate of the control logic diagram 1100 of FIG. 11 produces a high output (e.g., output=1) if all inputs are high, and produces a low output (e.g., output=0) if any input is low. Each NOT gate of the control logic diagram 1100 of FIG. 11 produces a high output (e.g., output=1) if the input is low, and produces a low output (e.g., output=0) if the input is high. Each time delay function of the control logic diagram 1100 of FIG. 11 introduces a time delay (e.g., a one second delay) into a subsequent process to be performed according to the control logic diagram 1100 of FIG. 11 when the input to the time delay function transitions from low to high (e.g., from 0 to 1).

The first OR gate 1102 of FIG. 11 produces a high output if the input from the left throttle position sensor 808 of FIGS. 8 and 10 or the input from the right throttle position sensor 810 of FIGS. 8 and 10 indicates that the left throttle or the right throttle of the aircraft 100 of FIG. 1 is in a takeoff position (e.g., that a throttle position of the left throttle or the right throttle exceeds a throttle position threshold). The first OR gate 1102 of FIG. 11 produces a low output if neither the input from the left throttle position sensor 808 of FIGS. 8 and 10 nor the input from the right throttle position sensor 810 of FIGS. 8 and 10 indicates that the left throttle or the right throttle of the aircraft 100 of FIG. 1 is in a takeoff position. The output of the first OR gate 1102 of FIG. 11 is transmitted, conveyed, and/or otherwise relayed as an input to the first AND gate 1104 of FIG. 11.

The first AND gate 1104 of FIG. 11 produces a high output if the input from the flap position sensor(s) 806 of FIGS. 8 and 10 indicates that the flaps of the aircraft 100 of FIG. 1 are in a takeoff position, and if the input received at the first AND gate 1104 from the first OR gate 1102 of FIG. 11 is high. The first AND gate 1104 of FIG. 11 produces a low output if the input from the flap position sensor(s) 806 of FIGS. 8 and 10 does not indicate that the flaps of the aircraft 100 of FIG. 1 are in a takeoff position, and/or if the input received from the first OR gate 1102 of FIG. 11 is low. The output of the first AND gate 1104 of FIG. 11 is transmitted, conveyed, and/or otherwise relayed as an input to the first time delay function 1106 of FIG. 11.

In some examples, the first OR gate 1102 and/or the first AND gate 1104 is/are associated with an example takeoff configuration input 1116 to be transmitted, conveyed, and/or otherwise relayed as an input to the first time delay function 1106 of FIG. 11. In some examples, the takeoff configuration input 1116 may include inputs from one or more sensor(s) in addition to or as alternative to the left throttle position sensor 808, the right throttle position sensor 810, and/or the flap position sensor(s) 806 discussed above.

The first time delay function 1106 of FIG. 11 introduces a one second time delay into a subsequent process to be performed according to the control logic diagram 1100 of FIG. 11 when the input to the first time delay function 1106 of FIG. 11 transitions from low to high (e.g., from 0 to 1). In other examples, the time delay introduced by the first time delay function 1106 of FIG. 11 may be less than or greater than one second. The output of the first time delay function 1106 of FIG. 11 is transmitted, conveyed, and/or otherwise relayed as an input to the second AND gate 1114 of FIG. 11.

The second OR gate 1108 of FIG. 11 produces a high output if the input from the left engine speed sensor 812 of FIGS. 8 and 10 or the input from the right engine speed sensor 814 of FIGS. 8 and 10 indicates that the left engine 118 or the right engine 120 of the aircraft 100 of FIG. 1 is running (e.g., that an engine speed of the left engine 118 or the right engine 120 exceeds an engine speed threshold). The second OR gate 1108 of FIG. 11 produces a low output if neither the input from the left engine speed sensor 812 of FIGS. 8 and 10 nor the input from the right engine speed sensor 814 of FIGS. 8 and 10 indicates that the left engine 118 or the right engine 120 of the aircraft 100 of FIG. 1 is running. The output of the second OR gate 1108 of FIG. 11 is transmitted, conveyed, and/or otherwise relayed as an input to the second time delay function 1110 of FIG. 11.

The second time delay function 1110 of FIG. 11 introduces a one second time delay into a subsequent process to be performed according to the control logic diagram 1100 of FIG. 11 when the input to the second time delay function 1110 of FIG. 11 transitions from low to high (e.g., from 0 to 1). In other examples, the time delay introduced by the second time delay function 1110 of FIG. 11 may be less than or greater than one second. The input to the second time delay function 1110 of FIG. 11 is high when all of the on-ground sensor(s) 802 of FIGS. 8 and 10 indicate that the first set of wheels 108 of the LMLG 106 and the second set of wheels 112 of the RMLG 110 of the aircraft 100 of FIG. 1 are off of the ground (e.g., not in contact with a ground surface). The input to the second time delay function 1110 of FIG. 11 is low when any of the on-ground sensor(s) 802 of FIGS. 8 and 10 indicates that the first set of wheels 108 of the LMLG 106 or the second set of wheels 112 of the RMLG 110 of the aircraft 100 of FIG. 1 is/are not off of the ground (e.g., in contact with a ground surface). The output of the second time delay function 1110 of FIG. 11 is transmitted, conveyed, and/or otherwise relayed as an input to the second AND gate 1114 of FIG. 11.

The NOT gate 1112 of FIG. 11 produces an output that is inverted relative to an input received from the landing gear position sensor(s) 804 of FIGS. 8 and 10. The input to the NOT gate 1112 of FIG. 11 is high when all of the landing gear position sensor(s) 804 of FIGS. 8 and 10 indicate that the LMLG 106 and the RMLG 110 of the aircraft 100 of FIG. 1 are in a retracted position and locked. The input to the NOT gate 1012 of FIG. 10 is low when any of the landing gear position sensor(s) 804 of FIGS. 8 and 10 indicates that the LMLG 106 or the RMLG 110 of the aircraft 100 of FIG. 1 is/are not in a retracted position or not locked. The output of the NOT gate 1112 of FIG. 10 is transmitted, conveyed, and/or otherwise relayed as an input to the second AND gate 1114 of FIG. 11.

The second AND gate 1114 of FIG. 11 produces a high output if the input received from the first time delay function 1106, the input received from the second OR gate 1108, the input received from the second time delay function 1110, and the input received from the NOR gate 1112 of FIG. 11 are high. The second AND gate 1114 of FIG. 11 produces a low output if the input received from the first time delay function 1106, the input received from the second OR gate 1108, the input received from the second time delay function 1110, and/or the input received from the NOR gate 1112 of FIG. 11 is/are low. When the output of the second AND gate 1114 of FIG. 11 is high, the controller 816 of FIGS. 8 and 10 generates a retract braking control signal and/or command to initiate retract braking of the first set of wheels 108 of the LMLG 106 and/or the second set of wheels 112 of the RMLG 110 of FIG. 1, as generally described above in connection with FIGS. 8-10. The controller 816 transmits, conveys, and/or otherwise relays the control signal and/or command as an input to either the RBCV 826 of FIG. 8 or the electric brake control system 1026 of FIG. 10.

While example manners of implementing the first retract braking control system 800 and the second retract braking control system 1000 are illustrated in FIGS. 8-11, one or more of the elements, processes and/or devices illustrated in FIGS. 8-11 may be combined, divided, re-arranged, omitted, eliminated and/or implemented in any other way. Further, the example on-ground sensor(s) 802, the example landing gear position sensor(s) 804, the example flap position sensor(s) 806, the example left throttle position sensor 808, the example right throttle position sensor 810, the example left engine speed sensor 812, the example right engine speed sensor 814, the example controller 816, the first example control system 818, the first example memory 820, the second example control system 822, the second example memory 824, the example RBCV 826, the example 1026, and/or, more generally, the example retract braking control systems 800, 1000 of FIGS. 8-11 may be implemented by hardware, software, firmware and/or any combination of hardware, software and/or firmware. Thus, for example, any of the example on-ground sensor(s) 802, the example landing gear position sensor(s) 804, the example flap position sensor(s) 806, the example left throttle position sensor 808, the example right throttle position sensor 810, the example left engine speed sensor 812, the example right engine speed sensor 814, the example controller 816, the first example control system 818, the first example memory 820, the second example control system 822, the second example memory 824, the example RBCV 826, the example 1026, and/or, more generally, the example retract braking control systems 800, 1000 of FIGS. 8-11 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example on-ground sensor(s) 802, the example landing gear position sensor(s) 804, the example flap position sensor(s) 806, the example left throttle position sensor 808, the example right throttle position sensor 810, the example left engine speed sensor 812, the example right engine speed sensor 814, the example controller 816, the first example control system 818, the first example memory 820, the second example control system 822, the second example memory 824, the example RBCV 826, the example 1026, and/or, more generally, the example retract braking control systems 800, 1000 of FIGS. 8-11 is/are hereby expressly defined to include a non-transitory computer readable storage device or storage disk such as a memory, a digital versatile disk (DVD), a compact disk (CD), a Blu-ray disk, etc. including the software and/or firmware. Further still, the example retract braking control systems 800, 1000 of FIGS. 8-11 may include one or more elements, processes and/or devices in addition to, or instead of, those illustrated in FIGS. 8-11, and/or may include more than one of any or all of the illustrated elements, processes and devices.

Figure 12:
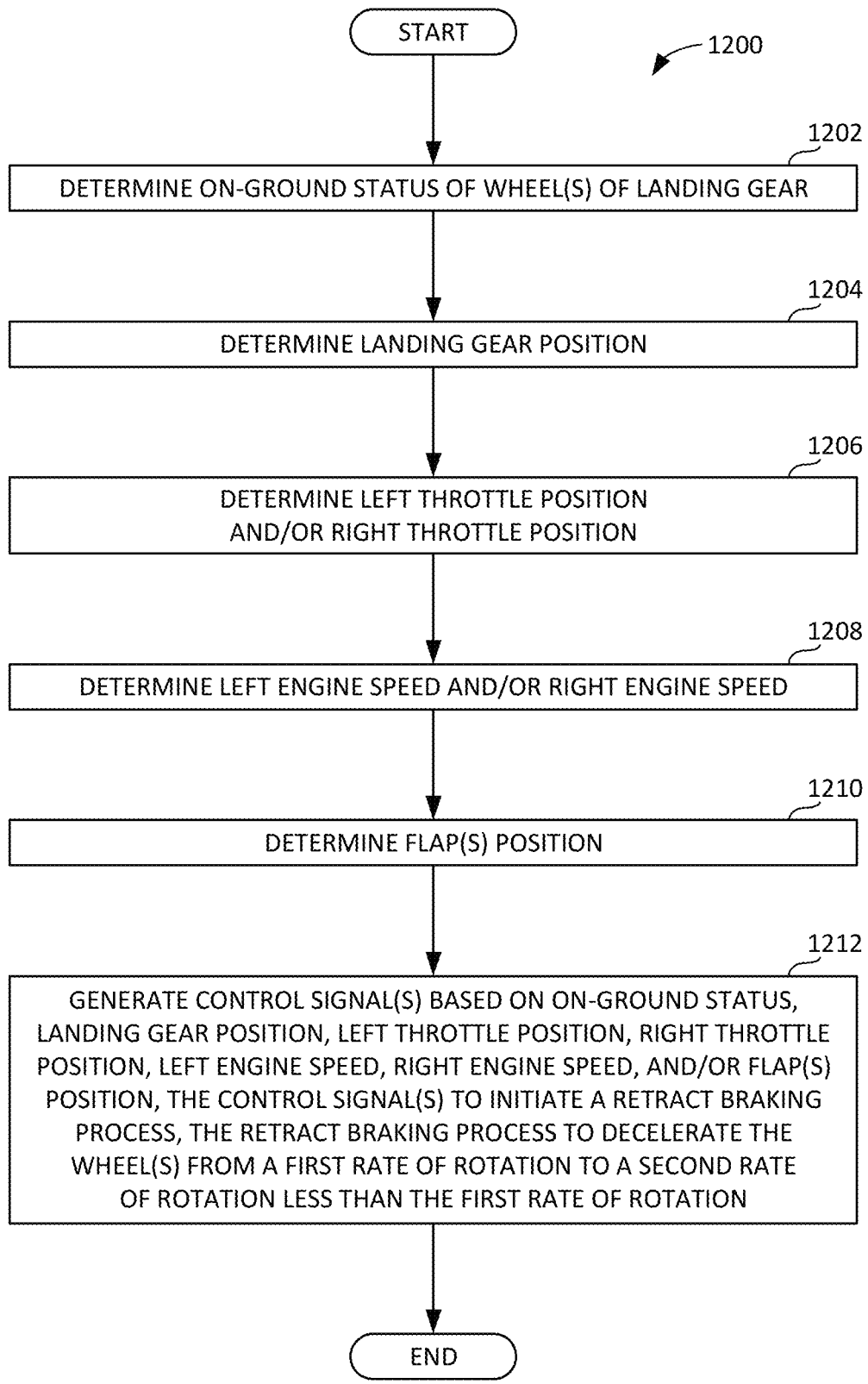
FIG. 12 is a flowchart representative of an example method that may be executed at the example controller of the example retract braking control systems of FIGS. 8-11 to control landing gear retract braking.

A flowchart representative of an example method for implementing the example retract braking control systems 800, 1000 of FIGS. 8-11 to control landing gear retract braking is shown in FIG. 12. In this example, the method may be implemented using machine-readable instructions that comprise one or more program(s) for execution by one or more processor(s) such as the processor 1302 shown in the example processor platform 1300 discussed below in connection with FIG. 13. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 1302, but the entirety of any program and/or parts thereof could alternatively be executed by a device other than the processor 1302, and/or embodied in firmware or dedicated hardware. Further, although the example program(s) is/are described with reference to the flowchart illustrated in FIG. 12, many other methods of implementing the example retract braking control systems 800, 1000 of FIGS. 8-11 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 12 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 12 is a flowchart representative of an example method 1200 that may be executed at the example controller 816 of the example retract braking control systems 800, 1000 of FIGS. 8-11 to control landing gear retract braking. The example method 1200 of FIG. 12 begins when the controller 816 of FIGS. 8 and 10 determines an on-ground status of a wheel of a landing gear (block 1202). For example, the controller 816 may determine the on-ground status of a wheel of a landing gear of the aircraft 100 of FIG. 1 based on the on-ground status data sensed and/or detected via on-ground sensor(s) 802 of FIGS. 8 and 10. In some examples, the controller 816 may determine whether the on-ground status of the wheel indicates that the wheel is not contacting a ground surface. Following block 1202, control of the example method 1200 of FIG. 12 proceeds to block 1204.

At block 1204, the controller 816 of FIGS. 8 and 10 determines a landing gear position of the landing gear (block 1204). For example, the controller 816 may determine the landing gear position (e.g., whether the landing gear is in a retracted position and/or whether the landing gear is locked) of a landing gear of the aircraft 100 of FIG. 1 based on the landing gear position data sensed and/or detected via the landing gear position sensor(s) 804 of FIGS. 8 and 10. In some examples, the controller 816 may determine whether the landing gear position indicates that the landing gear is not in a retracted position, and/or indicates that the landing gear is not locked. Following block 1204, control of the example method 1200 of FIG. 12 proceeds to block 1206.

At block 1206, the controller 816 of FIGS. 8 and 10 determines a left throttle position and/or a right throttle position (block 1206). For example, the controller 816 may determine the throttle position of a left throttle of the aircraft 100 of FIG. 1 based on the left throttle position data sensed and/or detected via the left throttle position sensor 808 of FIGS. 8 and 10. The controller 816 may additionally or alternatively determine the throttle position of a right throttle of the aircraft 100 of FIG. 1 based on the right throttle position data sensed and/or detected via the right throttle position sensor 810 of FIGS. 8 and 10. In some examples, the controller 816 may determine whether the left throttle position and/or the right throttle position exceed(s) a throttle position threshold. Following block 1206, control of the example method 1200 of FIG. 12 proceeds to block 1208.

At block 1208, the controller 816 of FIGS. 8 and 10 determines a left engine speed and/or a right engine speed (block 1208). For example, the controller 816 may determine the engine speed of the left engine 118 of the aircraft 100 of FIG. 1 based on the left engine speed data sensed and/or detected via the left engine speed sensor 812 of FIGS. 8 and 10. The controller 816 may additionally or alternatively determine the engine speed of the right engine 120 of the aircraft 100 of FIG. 1 based on the right engine speed data sensed and/or detected via the right engine speed sensor 814 of FIGS. 8 and 10. In some examples, the controller 816 may determine whether the left engine speed and/or the right engine speed exceed(s) an engine speed threshold. Following block 1208, control of the example method 1200 of FIG. 12 proceeds to block 1210.

At block 1210, the controller 816 of FIGS. 8 and 10 determines a flap position (block 1210). For example, the controller 816 may determine the flap position of a wing flap of the aircraft 100 of FIG. 1 based on the flap position data sensed and/or detected via the flap position sensor(s) 806 of FIGS. 8 and 9. In some examples, the controller 816 may determine whether the flap position indicates that the wing flap of the aircraft 100 of FIG. 1 is in a takeoff position. Following block 1210, control of the example method 1200 of FIG. 12 proceeds to block 1212.

At block 1212, the controller 816 of FIGS. 8 and 10 generates one or more control signal(s) based on the on-ground status, the landing gear position, the left throttle position, the right throttle position, the left engine speed, the right engine speed, and/or the flap position (block 1212). For example, the controller 816 may execute and/or otherwise implement the example control logic diagram 1100 of FIG. 11 described above to generate one or more control signal(s) based on the on-ground status, the landing gear position, the left throttle position, the right throttle position, the left engine speed, the right engine speed, and/or the flap position. In some examples, the control signal(s) is/are to initiate a retract braking process for the wheel. In some disclosed examples, the retract braking process is to decelerate the wheel from a first rate of rotation to a second rate of rotation less than the first rate of rotation. Following block 1212, the example method 1200 of FIG. 12 ends.

Figure 13:
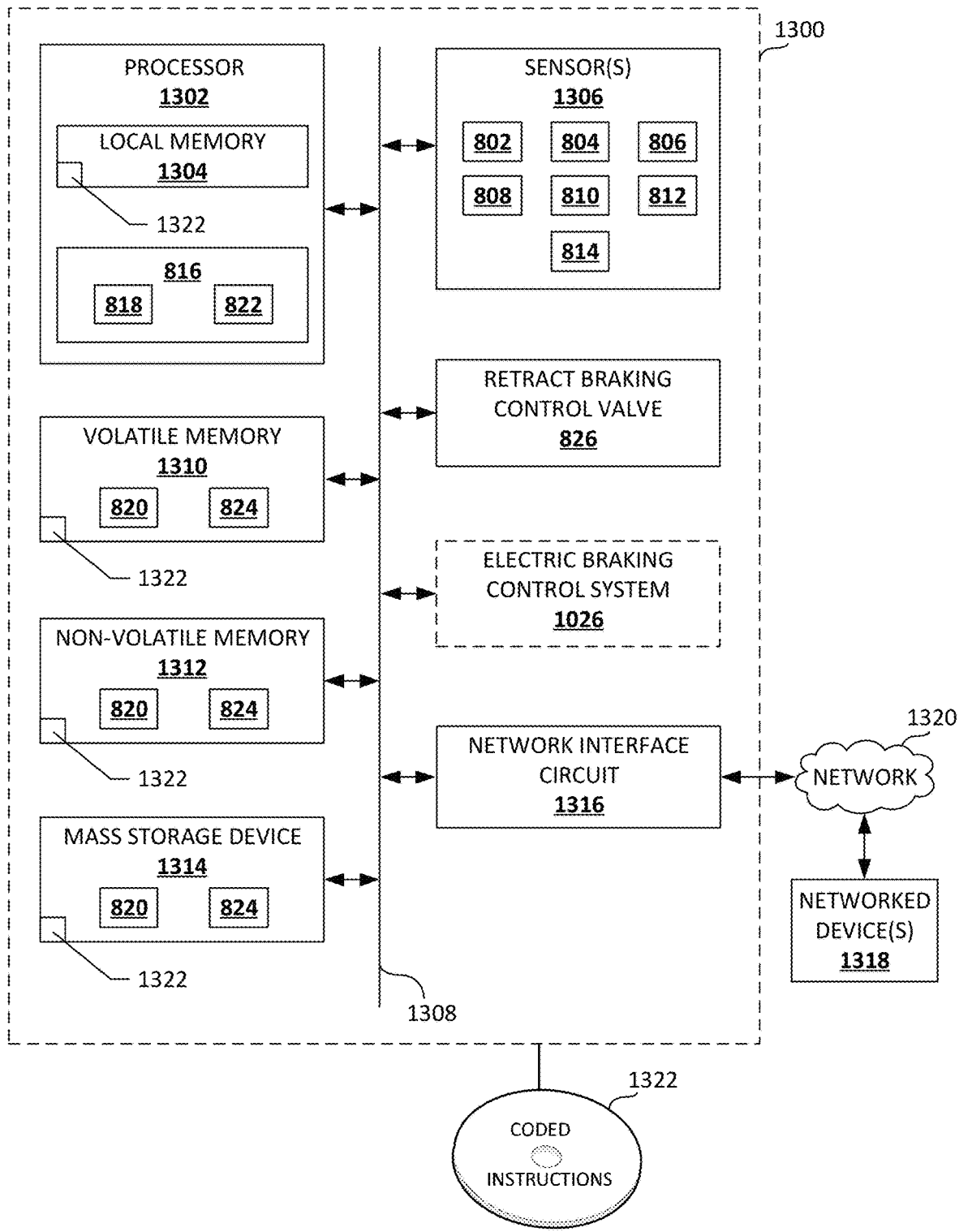
FIG. 13 is a block diagram of an example processor platform capable of executing instructions to implement the example method of FIG. 12, and the example retract braking control systems of FIGS. 8-11.

FIG. 13 is a block diagram of an example processor platform 1300 capable of executing instructions to implement the example method 1200 of FIG. 12, and the example retract braking control systems 800, 1000 of FIGS. 8-11. The processor platform 1300 of the illustrated example includes a processor 1302. The processor 1302 of the illustrated example is hardware. For example, the processor 1302 can be implemented by one or more integrated circuit(s), logic circuit(s), microprocessor(s) or controller(s) from any desired family or manufacturer. In the example of FIG. 13, the processor 1302 implements the example controller 816, the first example control system 818, and the second example control system 822 of FIGS. 8 and 10. The processor 1302 of the illustrated example also includes a local memory 1304 (e.g., a cache).

The processor 1302 of the illustrated example is in communication with one or more sensor(s) 1306 via a bus 1308 (e.g., a CAN bus). In the example of FIG. 13, the sensor(s) 1306 include the example on-ground sensor(s) 802, the example landing gear position sensor(s) 804, the example flap position sensor(s) 806, the example left throttle position sensor 808, the example right throttle position sensor 810, the example left engine speed sensor 812, and the example right engine speed sensor 814 of FIGS. 8 and 10.

In some examples, the processor 1302 of the illustrated example is also in communication with the example RBCV 826 of FIGS. 8 and 9 via the bus 1308. In other examples, the processor 1302 of the illustrated example is also in communication with the example electric braking control system 1026 of FIG. 10 via the bus 1308.

The processor 1302 of the illustrated example is also in communication with a main memory including a volatile memory 1310 and a non-volatile memory 1312 via the bus 1308. The volatile memory 1310 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1312 may be implemented by flash memory and/or any other desired type of memory device. Access to the volatile memory 1310 and the non-volatile memory 1312 is controlled by a memory controller. In the illustrated example, the main memory 1310, 1312 includes the first example memory 820 and the second example memory 824 of FIGS. 8 and 10.

The processor 1302 of the illustrated example is also in communication with a mass storage device 1314 for storing software and/or data. The mass storage device 1314 may be implemented, for example, via one or more floppy disk drives, hard drive disks, compact disk drives, Blu-ray disk drives, RAID systems, digital versatile disk (DVD) drives, etc. In the illustrated example, the mass storage device 1314 includes the first example memory 820 and the second example memory 824 of FIGS. 8 and 10.

The processor platform 1300 of the illustrated example also includes a network interface circuit 1316. The network interface circuit 1316 may be implemented by any type of interface standard, such as an Ethernet interface, a universal serial bus (USB), and/or a PCI express interface. The network interface circuit 1316 of the illustrated example includes a communication device such as a transmitter, a receiver, a transceiver, a modem and/or network interface card to facilitate exchange of data with one or more networked device(s) 1318 (e.g., computing and/or controller devices of any kind) via a network 1320 (e.g., a controller area network, a wireless network, a cellular network, etc.).

Coded instructions 1322 for implementing the example method 1200 of FIG. 12 may be stored in the local memory 1304, in the volatile memory 1310, in the non-volatile memory 1312, on the mass storage device 1314, and/or on a removable tangible computer readable storage medium such as a CD or DVD.

From the foregoing, it will be appreciated that the disclosed methods and apparatus advantageously provide for automated control of the retract braking of the first set of wheels 108 of the LMLG 106 and/or the second set of wheels 112 of the RMLG 110 of the aircraft 100 of FIG. 1. Automating the retract braking of the first and second sets of wheels 108, 112 advantageously advances the initiation of the retract braking process to an earlier time following takeoff of the aircraft 100 than would otherwise be the case. For example, in response to determining that certain takeoff criteria associated with the aircraft 100 of FIG. 1 have been satisfied, the disclosed retract braking control systems may automatically initiate the retract braking of the first and second sets of wheels 108, 112 of FIG. 1 at a time prior to the landing gear lever of the aircraft 100 of FIG. 1 being manually actuated into the up position.

Advancing the initiation of the retract braking process advantageously enables the retract braking process to be completed at an earlier time relative to the timing of the landing gear retraction process. Advancing the initiation of the retract braking process additionally or alternatively enables the rate of deceleration and/or despin applied to the first and second sets of wheels 108, 112 to be decreased to advantageously reduce the extent of the applied deceleration moment and the resulting rebound that may otherwise be more significant when the deceleration and/or despin is/are required to occur within a shorter time period. The disclosed retract braking control systems accordingly reduce the likelihood of the first set of wheels 108 of the LMLG 106 and/or the second set of wheels 112 of the RMLG 110 of the aircraft 100 of FIG. 1 colliding with wing-to-body fairings surrounding the wells 114, 116 of the aircraft 100 of FIG. 1 in connection with the landing gear retraction process. The disclosed retract braking control systems also reduce fatigue on the struts and/or links of the LMLG 106 and the RMLG 110 of the aircraft 100 of FIG. 1.

Methods and apparatus for controlling landing gear retract braking are disclosed. In some examples, an apparatus is disclosed. In some disclosed examples, the apparatus comprises a controller. In some disclosed examples, the controller is to determine an on-ground status of a wheel of a landing gear. In some disclosed examples, the controller is to generate a control signal based on the on-ground status of the wheel. In some disclosed examples, the control signal is to initiate a retract braking process for the wheel. In some disclosed examples, the retract braking process is to decelerate the wheel from a first rate of rotation to a second rate of rotation less than the first rate of rotation. In some disclosed examples, the controller is to generate the control signal in response to the on-ground status of the wheel indicating that the wheel is not contacting a ground surface.

In some disclosed examples, the controller is also to determine an engine speed of at least one of a left engine or a right engine. In some disclosed examples, the controller is to generate the control signal based further on the engine speed of the at least one of the left engine or the right engine. In some disclosed examples, the controller is to generate the control signal in response to determining that the engine speed of the at least one of the left engine or the right engine exceeds an engine speed threshold.

In some disclosed examples, the controller is also to determine a throttle parameter of at least one of a left throttle or a right throttle. In some disclosed examples, the controller is to generate the control signal based further on the throttle parameter of the at least one of the left throttle or the right throttle. In some disclosed examples, the controller is to generate the control signal in response to determining that the throttle parameter of the at least one of the left throttle or the right throttle exceeds a throttle parameter threshold.

In some disclosed examples, the controller is also to determine a landing gear position of the landing gear. In some disclosed examples, the controller is to generate the control signal based further on the landing gear position of the landing gear. In some disclosed examples, the controller is to generate the control signal in response to the landing gear position of the landing gear indicating that the landing gear is not retracted or not locked.

In some disclosed examples, the controller is also to determine a flap position of a flap. In some disclosed examples, the controller is to generate the control signal based further on the flap position of the flap. In some disclosed examples, the controller is to generate the control signal in response to determining that the flap position of the flap corresponds to a takeoff position.

In some examples, a method is disclosed. In some disclosed examples, the method comprises determining, by executing one or more instructions via a controller, an on-ground status of a wheel of a landing gear. In some disclosed examples, the method further comprises generating, by executing one or more instructions via the controller, a control signal based on the on-ground status of the wheel. In some disclosed examples, the control signal is to initiate a retract braking process for the wheel. In some disclosed examples, the retract braking process is to decelerate the wheel from a first rate of rotation to a second rate of rotation less than the first rate of rotation. In some disclosed examples, the generating of the control signal is in response to the on-ground status of the wheel indicating that the wheel is not contacting a ground surface.

In some disclosed examples, the method further comprises determining, by executing one or more instructions via the controller, an engine speed of at least one of a left engine or a right engine. In some disclosed examples, the method further comprises generating the control signal based further on the engine speed of the at least one of the left engine or the right engine. In some disclosed examples, the generating of the control signal is in response to determining that the engine speed of the at least one of the left engine or the right engine exceeds an engine speed threshold.

In some disclosed examples, the method further comprises determining, by executing one or more instructions via the controller, a throttle parameter of at least one of a left throttle or a right throttle. In some disclosed examples, the method further comprises generating the control signal based further on the throttle parameter of the at least one of the left throttle or the right throttle. In some disclosed examples, the generating of the control signal control signal is in response to determining that the throttle parameter of the at least one of the left throttle or the right throttle exceeds a throttle parameter threshold.

In some disclosed examples, the method further comprises determining, by executing one or more instructions via the controller, a landing gear position of the landing gear. In some disclosed examples, the method further comprises generating the control signal based further on the landing gear position of the landing gear. In some disclosed examples, the generating of the control signal is in response to the landing gear position of the landing gear indicating that the landing gear is not retracted or not locked.

In some disclosed examples, the method further comprises determining, by executing one or more instructions via the controller, a flap position of a flap. In some disclosed examples, the method further comprises generating the control signal based further on the flap position of the flap. In some disclosed examples, the degenerating of the control signal is in response to determining that the flap position of the flap corresponds to a takeoff position.

In some examples, a non-transitory machine-readable storage medium comprising instructions is disclosed. In some disclosed examples, the instructions, when executed, cause a controller to determine an on-ground status of a wheel of a landing gear. In some disclosed examples, the instructions, when executed, cause the controller to generate a control signal based on the on-ground status of the wheel. In some disclosed examples, the control signal is to initiate a retract braking process for the wheel. In some disclosed examples, the retract braking process is to decelerate the wheel from a first rate of rotation to a second rate of rotation less than the first rate of rotation. In some disclosed examples, the instructions, when executed, cause the controller to generate the control signal in response to the on-ground status of the wheel indicating that the wheel is not contacting a ground surface.

In some disclosed examples, the instructions, when executed, also cause the controller to determine an engine speed of at least one of a left engine or a right engine. In some disclosed examples, the instructions, when executed, cause the controller to generate the control signal based further on the engine speed of the at least one of the left engine or the right engine. In some disclosed examples, the instructions, when executed, cause the controller to generate the control signal in response to determining that the engine speed of the at least one of the left engine or the right engine exceeds an engine speed threshold.

In some disclosed examples, the instructions, when executed, also cause the controller to determine a throttle parameter of at least one of a left throttle or a right throttle. In some disclosed examples, the instructions, when executed, cause the controller to generate the control signal based further on the throttle parameter of the at least one of the left throttle or the right throttle. In some disclosed examples, the instructions, when executed, cause the controller to generate the control signal in response to determining that the throttle parameter of the at least one of the left throttle or the right throttle exceeds a throttle parameter threshold.

In some disclosed examples, the instructions, when executed, also cause the controller to determine a landing gear position of the landing gear. In some disclosed examples, the instructions, when executed, cause the controller to generate the control signal based further on the landing gear position of the landing gear. In some disclosed examples, the instructions, when executed, cause the controller to generate the control signal in response to the landing gear position of the landing gear indicating that the landing gear is not retracted or not locked.

In some disclosed examples, the instructions, when executed, also cause the controller to determine a flap position of a flap. In some disclosed examples, the instructions, when executed, cause the controller to generate the control signal based further on the flap position of the flap. In some disclosed examples, the instructions, when executed, cause the controller to generate the control signal in response to determining that the flap position of the flap corresponds to a takeoff position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
   a controller to:
      determine an on-ground status of a wheel of a landing gear; and
      generate a control signal in response to the on-ground status of the wheel indicating that the wheel is not contacting a ground surface, the control signal to automatically initiate a retract braking process for the wheel prior to a landing gear lever being manually actuated into a gear up position, the retract braking process to decelerate the wheel from a first rate of rotation to a second rate of rotation less than the first rate of rotation.

2. The apparatus of claim 1, wherein the controller is to:
determine an engine speed of at least one of a left engine or a right engine; and
generate the control signal based further on the engine speed of the at least one of the left engine or the right engine.

3. The apparatus of claim 2, wherein the controller is to generate the control signal in response to determining that the engine speed of the at least one of the left engine or the right engine exceeds an engine speed threshold.

4. The apparatus of claim 1, wherein the controller is to:
determine a throttle parameter of at least one of a left throttle or a right throttle; and
generate the control signal based further on the throttle parameter of the at least one of the left throttle or the right throttle.

5. The apparatus of claim 4, wherein the controller is to generate the control signal in response to determining that the throttle parameter of the at least one of the left throttle or the right throttle exceeds a throttle parameter threshold.

6. The apparatus of claim 1, wherein the controller is to:
determine a landing gear position of the landing gear; and
generate the control signal based further on the landing gear position of the landing gear.

7. The apparatus of claim 6, wherein the controller is to generate the control signal in response to the landing gear position of the landing gear indicating that the landing gear is not retracted or not locked.

8. The apparatus of claim 1, wherein the controller is to:
determine a flap position of a flap; and
generate the control signal based further on the flap position of the flap.

9. The apparatus of claim 8, wherein the controller is to generate the control signal in response to determining that the flap position of the flap corresponds to a takeoff position.

10. A method comprising:
determining, by executing one or more instructions via a controller, an on-ground status of a wheel of a landing gear; and
generating, by executing one or more instructions via the controller, a control signal in response to the on-ground status of the wheel indicating that the wheel is not contacting a ground surface, the control signal to automatically initiate a retract braking process for the wheel prior to a landing gear lever being manually actuated into a gear up position, the retract braking process to decelerate the wheel from a first rate of rotation to a second rate of rotation less than the first rate of rotation.

11. The method of claim 10, further comprising:
determining, by executing one or more instructions via the controller, an engine speed of at least one of a left engine or a right engine; and
generating the control signal based further on the engine speed of the at least one of the left engine or the right engine.

12. The method of claim 10, further comprising:
determining, by executing one or more instructions via the controller, a throttle parameter of at least one of a left throttle or a right throttle; and
generating the control signal based further on the throttle parameter of the at least one of the left throttle or the right throttle.

13. The method of claim 10, further comprising:
determining, by executing one or more instructions via the controller, a landing gear position of the landing gear; and
generating the control signal based further on the landing gear position of the landing gear.

14. A non-transitory machine-readable storage medium comprising instructions that, when executed, cause a controller to at least:
determine an on-ground status of a wheel of a landing gear; and
generate a control signal in response to the on-ground status of the wheel indicating that the wheel is not contacting a ground surface, the control signal to automatically initiate a retract braking process for the wheel prior to a landing gear lever being manually actuated into a gear up position, the retract braking process to decelerate the wheel from a first rate of rotation to a second rate of rotation less than the first rate of rotation.

15. The non-transitory machine-readable storage medium of claim 14, wherein the instructions, when executed, cause the controller to:
determine an engine speed of at least one of a left engine or a right engine; and
generate the control signal based further on the engine speed of the at least one of the left engine or the right engine.

16. The non-transitory machine-readable storage medium of claim 14, wherein the instructions, when executed, cause the controller to:
determine a throttle parameter of at least one of a left throttle or a right throttle; and
generate the control signal based further on the throttle parameter of the at least one of the left throttle or the right throttle.

17. The non-transitory machine-readable storage medium of claim 14, wherein the instructions, when executed, cause the controller to:
determine a landing gear position of the landing gear; and
generate the control signal based further on the landing gear position of the landing gear.

18. The method of claim 11, wherein generating the control signal based further on the engine speed of the at least one of the left engine or the right engine includes generating the control signal in response to determining that the engine speed of the at least one of the left engine or the right engine exceeds an engine speed threshold.

19. The method of claim 12, wherein generating the control signal based further on the throttle parameter of the at least one of the left throttle or the right throttle includes generating the control signal in response to determining that the throttle parameter of the at least one of the left throttle or the right throttle exceeds a throttle parameter threshold.

20. The method of claim 13, wherein generating the control signal based further on the landing gear position of the landing gear includes generating the control signal in response to the landing gear position of the landing gear indicating that the landing gear is not retracted or not locked.

* * * * *